United States Patent
Cho et al.

(10) Patent No.: US 11,394,130 B2
(45) Date of Patent: Jul. 19, 2022

(54) ANTENNA

(71) Applicant: SAMSUNG ELECTRO-MECHANICS CO., LTD., Suwon-si (KR)

(72) Inventors: Sangik Cho, Suwon-si (KR); Ju Ho Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 167 days.

(21) Appl. No.: 16/919,625

(22) Filed: Jul. 2, 2020

(65) Prior Publication Data

US 2021/0320421 A1 Oct. 14, 2021

(30) Foreign Application Priority Data

Apr. 14, 2020 (KR) .................. 10-2020-0045139

(51) Int. Cl.
*H01Q 21/30* (2006.01)
*H04B 3/52* (2006.01)
*H01Q 1/00* (2006.01)
*H01Q 1/22* (2006.01)
*H01Q 9/04* (2006.01)

(52) U.S. Cl.
CPC ............ *H01Q 21/30* (2013.01); *H01Q 1/005* (2013.01); *H01Q 1/2283* (2013.01); *H01Q 9/0414* (2013.01); *H04B 3/52* (2013.01)

(58) Field of Classification Search
CPC ...... H01Q 1/2283; H01Q 9/0414; H01Q 21/30
See application file for complete search history.

(56) References Cited

U.S. PATENT DOCUMENTS

| 9,196,965 | B2 | 11/2015 | Sabielny |
| 11,075,453 | B1 * | 7/2021 | Bulumulla ............... H01Q 1/48 |
| 2019/0081404 | A1 | 3/2019 | Jeon et al. |
| 2019/0393606 | A1 * | 12/2019 | Chavali ................ H01Q 1/2283 |

FOREIGN PATENT DOCUMENTS

KR 10-2019-0030311 A 3/2019

* cited by examiner

*Primary Examiner* — Daniel Munoz
(74) *Attorney, Agent, or Firm* — Morgan, Lewis & Bockius LLP

(57) ABSTRACT

An antenna includes a first dielectric layer having a first surface and a second surface, a second dielectric layer having a third surface and a fourth surface, and a reinforcing layer disposed between the first dielectric layer and the second dielectric layer and including an insulating material. A first adhesive layer is disposed between the first dielectric layer and the reinforcing layer, and a second adhesive layer is disposed between the second dielectric layer and the reinforcing layer. A first pattern layer is disposed on a surface of the first dielectric layer facing the first adhesive layer, and a second pattern layer is disposed on a surface of the second dielectric layer facing away from the second adhesive layer. The reinforcing layer has a first cavity penetrating a region between the first and second dielectric layers.

30 Claims, 22 Drawing Sheets

II-II'

III-III'

IV-IV'

V-V'

VI-VI'

VII-VII'

VIII-VIII'

ANTENNA

CROSS-REFERENCE TO RELATED APPLICATION(S)

This application claims benefit of priority to Korean Patent Application No. 10-2020-0045139 filed on Apr. 14, 2020 in the Korean Intellectual Property Office, the disclosure of which is incorporated herein by reference in its entirety.

BACKGROUND

The present disclosure relates to an antenna, and more particularly, to a chip-type patch antenna.

Mobile communications data traffic has increased on an annual basis. Various techniques have been actively developed to support rapidly increasing demand for throughput of real-time data in wireless networks. For example, conversion of Internet of Things (IoT)-based data into contents, augmented reality (AR), virtual reality (VR), live VR/AR linked with SNS, an automatic driving function, applications such as a sync view (transmission of real-time images from a user's viewpoint using a compact camera), and the like, may require communications which support the transmission and reception of large volumes of data (e.g., 5G communications, mmWave communications, and the like). Accordingly, research into millimeter wave (mmWave) communications including 5th generation (5G) communications has been actively conducted, and research into commercialization/standardization of an antenna which may smoothly implement such communications has also been actively conducted.

SUMMARY

An aspect of the present disclosure is to provide an antenna which may improve antenna performance and may stably obtain improved antenna performance, and may have improved reliability.

Another aspect of the present disclosure is to provide an antenna which may increase efficiency and may have a reduced size.

According to an aspect of the present disclosure, an antenna is configured as a chip-type antenna, in which a reinforcing layer having high strength along with an adhesive layer having a low dielectric constant may be introduced between dielectric layers having a high dielectric constant, and a cavity may be formed in the reinforcing layer.

For example, according to an aspect of the present disclosure, an antenna include a first dielectric layer having a first surface, and a second surface opposing the first surface, a second dielectric layer having a third surface and a fourth surface opposing the third surface, and a reinforcing layer disposed between the first dielectric layer and the second dielectric layer, having a fifth surface and a sixth surface opposing the fifth surface, and including an insulating material. A first adhesive layer is disposed between the second surface of the first dielectric layer and the fifth surface of the reinforcing layer, and a second adhesive layer is disposed between the third surface of the second dielectric layer and the sixth surface of the reinforcing layer. A first pattern layer is disposed on the second surface of the first dielectric layer, and a second pattern layer is disposed on the fourth surface of the second dielectric layer. The reinforcing layer has a first cavity penetrating a region between the fifth surface and the sixth surface.

For example, according to an aspect of the present disclosure, an antenna includes a body portion including a plurality of dielectric layers and a plurality of adhesive layers disposed between the plurality of dielectric layers. A pattern portion includes a first pattern layer disposed in the body and a second pattern layer disposed on the body portion. A dielectric layer, among the plurality of dielectric layers, disposed between the plurality of adhesive layers has a cavity partially overlapping each of the first and second pattern layers in a stacking direction of the dielectric and adhesive layers.

In accordance with another aspect of the disclosure, an antenna includes first and second stacked dielectric layers having a third dielectric layer disposed therebetween, and first and second conductive patterns disposed on different ones of the first, second, and third dielectric layers. The third dielectric layer has a composition different from the first and second dielectric layers, and provides a cavity extending between the first and second dielectric layers.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
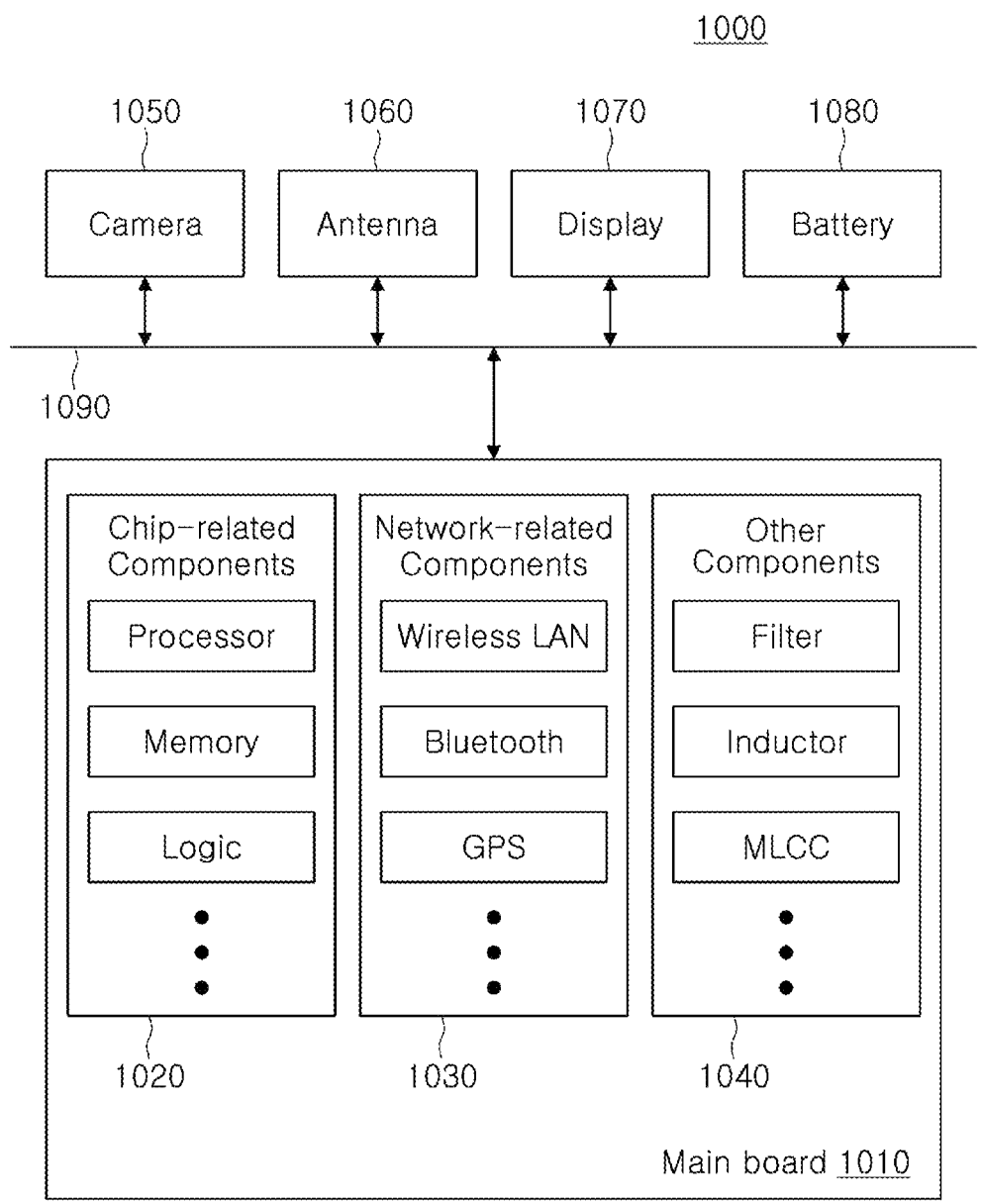
FIG. 1 is a block diagram illustrating an example of an electronic device system.

Hereinafter, example embodiments of the present disclosure will be described with reference to the accompanying drawings. In the drawings, shapes, sizes, and the like, of elements may be exaggerated or schematically illustrated for clarity of illustration and description.

FIG. 1 is a block diagram illustrating an example of an electronic device system.

Referring to FIG. 1, an electronic device 1000 may accommodate a mainboard 1010 therein. The mainboard 1010 may include chip related components 1020, network related components 1030, other components 1040, and the like, physically or electrically connected thereto. These components may be connected to others to be described below to form various signal lines 1090.

The chip related components 1020 may include a memory chip such as a volatile memory (for example, a dynamic random access memory (DRAM)), a non-volatile memory (for example, a read only memory (ROM)), a flash memory, or the like; an application processor chip such as a central processor (for example, a central processing unit (CPU)), a graphics processor (for example, a graphics processing unit (GPU)), a digital signal processor, a cryptographic processor, a microprocessor, a microcontroller, or the like; and a logic chip such as an analog-to-digital (ADC) converter, an application-specific integrated circuit (ASIC), or the like. However, the chip related components 1020 are not limited thereto, but may also include other types of chip related components. In addition, the chip related components 1020 may be combined with each other.

The network related components 1030 may include components compatible with and/or implementing protocols such as wireless fidelity (Wi-Fi) (Institute of Electrical And Electronics Engineers (IEEE) 802.11 family, or the like), worldwide interoperability for microwave access (WiMAX) (IEEE 802.16 family, or the like), IEEE 802.20, long term evolution (LTE), evolution data only (Ev-DO), high speed packet access+(HSPA+), high speed downlink packet access+(HSDPA+), high speed uplink packet access+ (HSUPA+), enhanced data GSM environment (EDGE), global system for mobile communications (GSM), global positioning system (GPS), general packet radio service (GPRS), code division multiple access (CDMA), time division multiple access (TDMA), digital enhanced cordless telecommunications (DECT), Bluetooth, 3G, 4G, and 5G protocols, and any other wireless and wired protocols, designated after the abovementioned protocols. However, the network related components 1030 are not limited thereto, but may also include components compatible with and/or implementing a variety of other wireless or wired standards or protocols. In addition, the network related components 1030 may be combined with each other, together with the chip related components 1020 described above.

Other components 1040 may include a high frequency inductor, a ferrite inductor, a power inductor, ferrite beads, a low temperature co-fired ceramic (LTCC), an electromagnetic interference (EMI) filter, a multilayer ceramic capacitor (MLCC), or the like. However, other components 1040 are not limited thereto, but may also include passive components used for various other purposes, or the like. In addition, other components 1040 may be combined with each other, together with the chip related components 1020 or the network related components 1030 described above.

Depending on a type of the electronic device 1000, the electronic device 1000 may include other components that may or may not be physically or electrically connected to the mainboard 1010. These other components may include, for example, a camera module 1050, an antenna 1060, a display device 1070, a battery 1080, an audio codec (not illustrated), a video codec (not illustrated), a power amplifier (not illustrated), a compass (not illustrated), an accelerometer (not illustrated), a gyroscope (not illustrated), a speaker (not illustrated), a mass storage unit (for example, a hard disk drive) (not illustrated), a compact disk (CD) drive (not illustrated), a digital versatile disk (DVD) drive (not illustrated), or the like. However, these other components are not limited thereto, but may also include other components used for various purposes depending on a type of electronic device 1000, or the like.

The electronic device 1000 may be a smartphone, a personal digital assistant (PDA), a digital video camera, a digital still camera, a network system, a computer, a monitor, a tablet PC, a laptop PC, a netbook PC, a television, a video game machine, a smartwatch, an automotive component, or the like. However, the electronic device 1000 is not limited thereto, but may be any other electronic device processing data.

Figure 2:
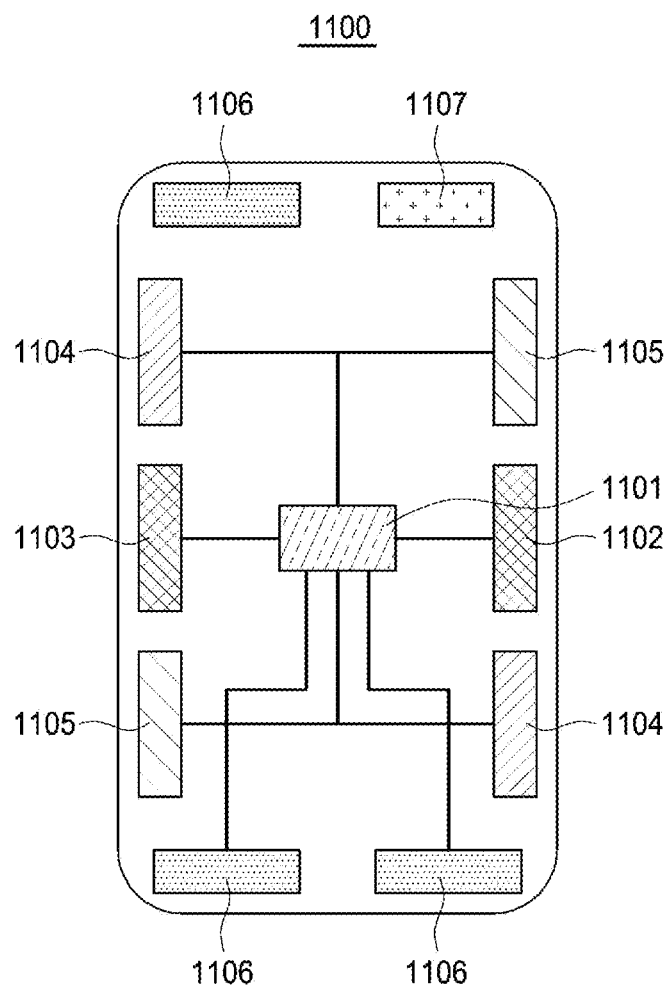
FIG. 2 is a plan diagram illustrating an example of an electronic device.

FIG. 2 is a planar diagram illustrating an example of an electronic device.

Referring to FIG. 2, an electronic device may be a smartphone 1100, for example. In the smartphone 1100, a modem 1101, and various types of antenna modules 1102, 1103, 1104, 1105, and 1106 connected to the modem 1101 through a rigid printed circuit board, a flexible printed circuit board, and/or a rigid flexible printed circuit board may be disposed. If desired, a Wi-Fi module 1107 may also be disposed. The antenna modules 1102, 1103, 1104, 1105, and 1106 may include the antenna modules 1102, 1103, 1104, and 1105 for various frequency ranges for 5G mobile communications, such as the antenna module 1102 for a 3.5 GHz band frequency, the antenna module 1103 for a 5 GHz band frequency, the antenna module 1104 for a 28 GHz band frequency, the antenna module 1105 for a 39 GHz band frequency, and the like, and may further include the other antenna module 1106 for 4G communications, but an example embodiment thereof is not limited thereto. The electronic device is not limited to the smartphone 1100, and may be implemented by the other electronic devices described above.

Figure 3:
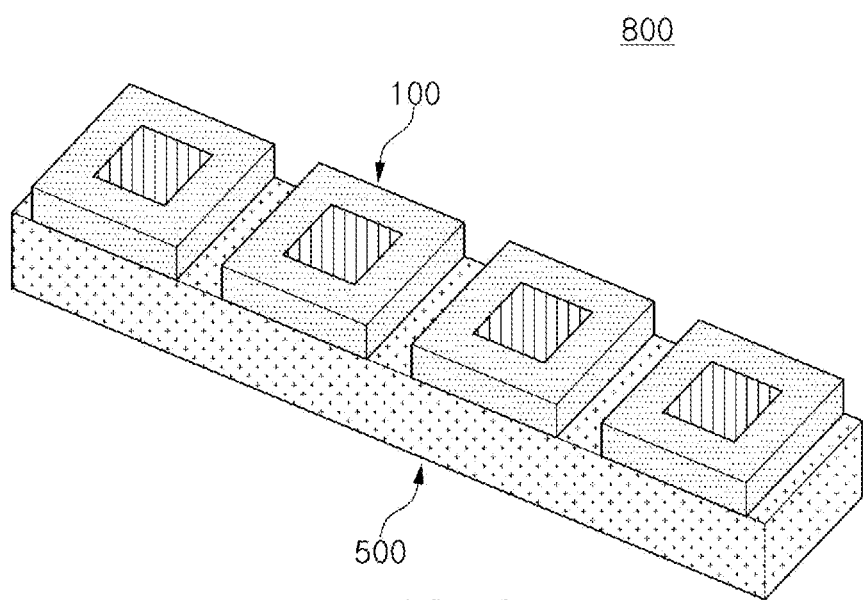
FIG. 3 is a perspective diagram illustrating an example of an antenna module.

FIG. 3 is a perspective diagram illustrating an example of an antenna module.

Referring to the diagram, an antenna module 800 in the example embodiment may include an antenna substrate 500 and a plurality of antennas 100 mounted on an upper surface of the antenna substrate 500. Each of the antennas 100 may be configured as a chip-type patch antenna. A chip in a chip-type antenna may indicate that the antenna 100 may be separately manufactured with respect to the antenna substrate 500 providing a dispositional space of the antenna 100 and may be disposed in the substrate. Each of the antennas 100 may be surface-mounted on the antenna substrate 500 using a connector metal such as solder, or the like. The antennas 100 may be disposed in a 1×4 arrangement as illustrated in FIG. 3, but an example embodiment thereof is not limited thereto. If desired, the antennas 100 may be disposed in various forms such as in a 1×2 or 2×2 arrangement. If desired, an electronic component may be mounted on a lower surface of the antenna substrate 500. The electronic component may include a radio frequency integrated circuit (RFIC), a power management IC (PMIC), or the like. The electronic component may further include a chip-type passive component, such as a chip-type capacitor or a chip-type inductor, for example. The electronic component may be surface-mounted on the antenna substrate 500 using a connector metal such as solder, or the like.

The antenna substrate 500 may be configured as a multilayer printed circuit board (PCB) including a plurality of insulating layers, a plurality of wiring layers, and a plurality of via layers. The antenna substrate 500 may include a first region including a plurality of first insulating layers, a plurality of first wiring layers, and a plurality of first via layers, and a second region including a plurality of second insulating layers, a plurality of second wiring layers, and a plurality of second via layers. In a thickness direction, the first region may be disposed on an upper side of the antenna substrate 500, and the second region may be disposed on a lower side of the antenna substrate 500. The first region may function as an antenna member, and the second region may function as a redistribution member. For example, at least a portion of the plurality of first insulating layers may include a material having a dielectric dissipation factor (Df) lower than that of at least a portion of the plurality of second insulating layers.

The plurality of first insulating layers may include a laminate in which a thermoplastic resin layer and a thermosetting resin layer are alternately layered. The thermoplastic resin layer may include a material effective for transmission of a radio frequency signal, and the thermosetting resin layer may include a material advantageous to transmission of a radio frequency signal and having adhesiveness. By using the multilayer resin layers, an insulation body which may be advantageous to transmission of a radio frequency signal and may have improved adhesiveness may be provided. The plurality of first wiring layers may be disposed on the thermoplastic resin layers, respectively, and may be embedded in the thermosetting resin layers, and may be connected to each other through the plurality of first via layers. Each of the plurality of first via layers may simultaneously penetrate an adjacent thermoplastic resin layer and an adjacent thermosetting resin layer.

As the thermoplastic resin layer, a liquid crystal polymer (LCP), polytetrafluoroethylene (PTFE), polyphenylene sulfide (PPS), polyphenylene ether (PPE), polyimide (PI), or the like, may be used in terms of transmission of a radio frequency signal. A dielectric dissipation factor (Df) may be adjusted according to a type of resin, a type of filler included in the resin, a content of filler, and the like, of the thermoplastic resin layer. A dielectric dissipation factor (Df) may be a value related to dielectric dissipation, and dielectric dissipation may refer to loss of power generated when an alternative electric field is formed on a resin layer (a dielectric material). A dielectric dissipation factor (Df) may be proportional to dielectric dissipation, and the lower the dielectric dissipation factor (Df), the less the dielectric dissipation. The thermoplastic resin layer having low dielectric dissipation properties may be advantageous for reduction of the dissipation in terms of transmission of a radio frequency signal. The dielectric dissipation factor (Df) of the thermoplastic resin layer may be 0.003 or lower, and may be, for example, 0.002 or lower. Also, a dielectric constant (Dk) of the thermoplastic resin layer may be 3.5 or lower. The dielectric constant (Dk) may be, although not limited thereto, measured through a vector network analyzer using a dielectric assessment kit (DAK), for example.

As the thermosetting resin layer, polyphenylene ether (PPE), modified polyimide (PI), modified epoxy, or the like, may be used in terms of transmission of a radio frequency signal. A dielectric dissipation factor (Df) may be adjusted according to a type of resin, a type of filler included in the resin, a content of filler, and the like, of the thermosetting resin layer. The thermosetting resin layer having low dielectric dissipation properties may be advantageous for reduction of the dissipation in terms of transmission of a radio frequency signal. A dielectric dissipation factor (Df) of the thermosetting resin layer may be 0.003 or lower, and may be, for example, 0.002 or lower. Also, a dielectric constant (Dk) of the thermosetting resin layer may be 3.5 or lower.

A thickness of the thermoplastic resin layer may be greater than a thickness of the thermosetting resin layer. It may be desirable to have the above-described thickness relationship in terms of transmission of a radio frequency signal. An interfacial surface between the thermoplastic resin layer and the thermosetting resin layer, upwardly and downwardly adjacent to each other, may include a rough surface. A rough surface may refer to a surface having serrations by being roughened. By including the rough surface, the thermoplastic resin layer and the thermosetting resin layer, upwardly and downwardly adjacent to each other, may secure adhesiveness working towards each other.

The plurality of second insulating layers may include an insulating material. As the insulating material, a thermosetting resin such as an epoxy resin, a thermoplastic resin such as a polyimide resin, a material including a reinforcing material including woven glass fiber and/or inorganic filler along with the above-described resins, such as such as prepreg, Ajinomoto build-up film (ABF), photoimageable dielectric (PID), or the like, may be used.

The plurality of first and second wiring layers may include a metal material. As the metal material, copper (Cu), aluminum (Al), silver (Ag), tin (Sn), gold (Au), nickel (Ni), lead (Pb), titanium (Ti), or alloys thereof may be used. The plurality of first and second wiring layers may be formed by an additive process (AP), a semi AP (SAP), a modified SAP (MSAP), a tenting (TT), or the like, and accordingly, each of the plurality of first and second wiring layers may include a seed layer, an electroless plating layer, and an electrolytic plating layer formed based on the seed layer. Each of the plurality of first and second wiring layers may perform various functions according to a design of the respective layer. For example, each of the plurality of first and second wiring layers may include a feeding pattern, and may also include a ground pattern, a power pattern, a signal pattern, or the like. Each pattern may include a line pattern, a plane pattern, and/or a pad pattern.

The plurality of first and second via layers may include a metal material. As the metal material, copper (Cu), aluminum (Al), silver (Ag), tin (Sn), gold (Au), nickel (Ni), lead (Pb), titanium (Ti), or alloys thereof may be used. The plurality of first and second via layers may be formed by a plating process such as an AP, an SAP, an MSAP, a TT, or the like, and accordingly, each of the plurality of first and second via layers may include a seed layer, an electroless plating layer, and an electrolytic plating layer formed based on the seed layer. The plurality of first and second via layers may perform various functions according to a design of the respective layer. For example, each of the plurality of first and second via layers may include a feeding via for feeding pattern connection, a signal via for signal connection, a ground via for ground connection, a power via for power connection, and the like. Each via may be completely filled with a metal material, or a metal material may be formed along a wall of a via hole, and may have various shapes such as a tapered shape, or the like.

Figure 4:
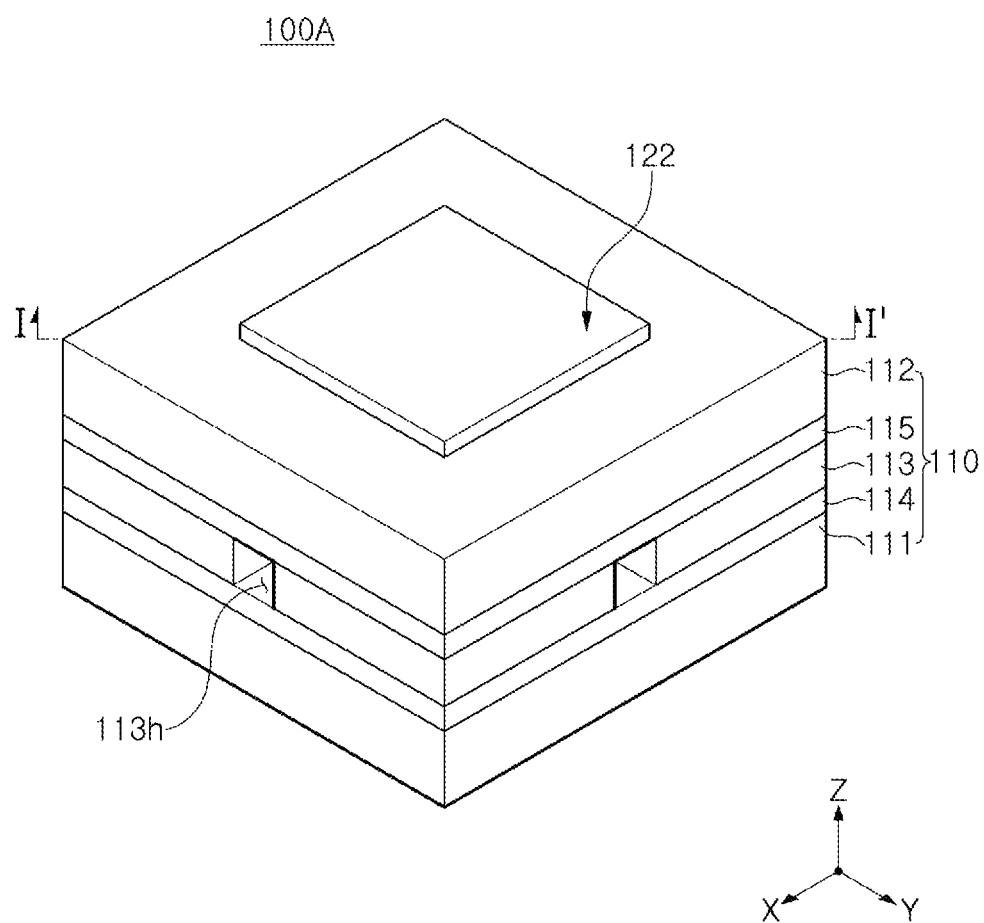
FIG. 4 is a perspective diagram illustrating an example of an antenna.

FIG. 4 is a perspective diagram illustrating an example of an antenna.

Figure 5:
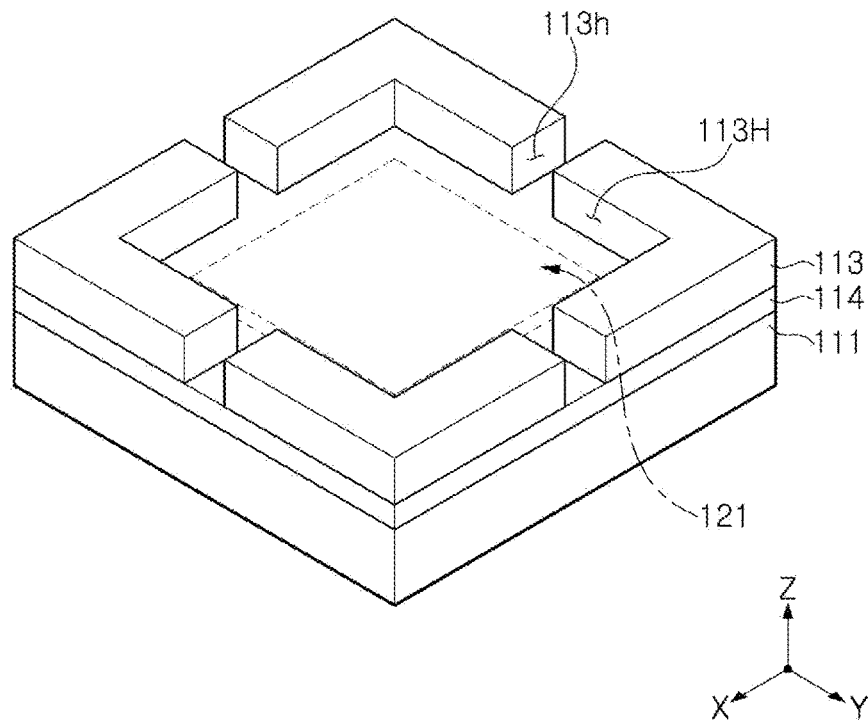
FIG. 5 is a perspective diagram illustrating an internal region of the antenna illustrated in FIG. 4.

FIG. 5 is a perspective diagram illustrating an internal region of the antenna illustrated in FIG. 4.

Figure 6:
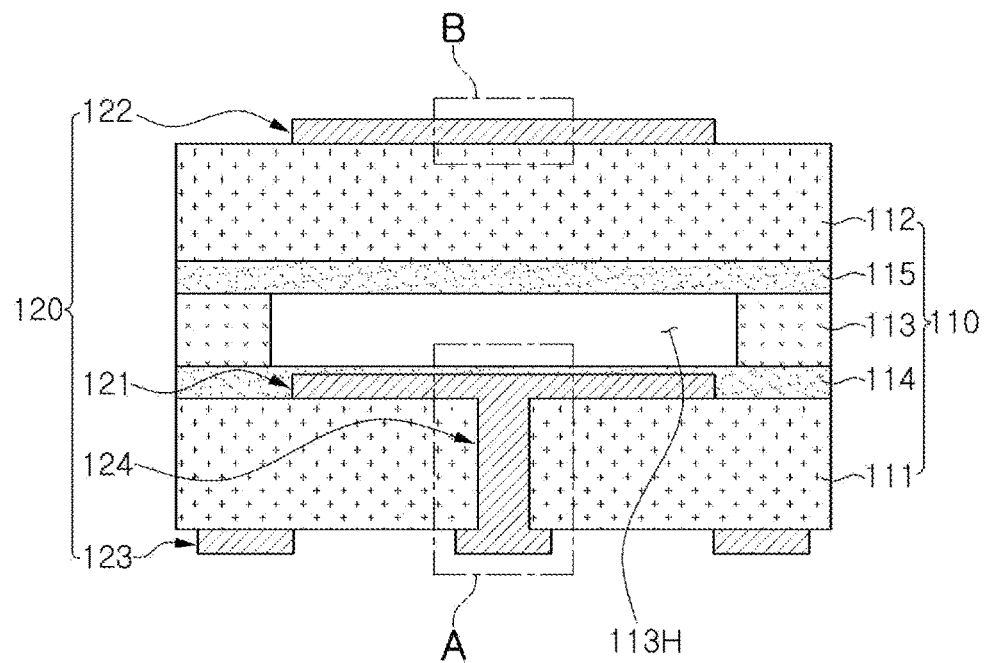
FIG. 6 is a cross-sectional diagram illustrating the antenna illustrated in FIG. 4 along line I-I'.

FIG. 6 is a cross-sectional diagram illustrating the antenna illustrated in FIG. 4 along line I-I'.

Referring to the diagrams, an antenna 100A in the example embodiment may include a body portion 110 and a pattern portion 120. The body portion 110 may include a first dielectric layer 111, a second dielectric layer 112, a reinforcing layer 113 disposed between the first and second dielectric layers 111 and 112, a first adhesive layer 114 disposed between the first dielectric layer 111 and the reinforcing layer 113 and connecting the first dielectric layer 111 and the reinforcing layer 113 to each other, and a second adhesive layer 115 disposed between the second dielectric layer 112 and the reinforcing layer 113 and connecting the second dielectric layer 112 and the reinforcing layer 113 to each other. The pattern portion 120 may include a first pattern layer 121 disposed on an upper surface of the first dielectric layer 111 and embedded in the first adhesive layer 114, and a second pattern layer 122 disposed on an upper surface of the second dielectric layer 112. The first pattern layer 121 may include a patch pattern. The second pattern layer 122 may include a coupling pattern. The patch pattern and the coupling pattern may partially overlap each other on a plane. If desired, the pattern portion 120 may further include a third pattern layer 123 disposed on a lower surface of the first dielectric layer 111, and a through-via layer 124 penetrating the first dielectric layer 111. The third pattern layer 123 may include a plurality of pad patterns. The through-via layer 124 may include a feed via connecting at least one of the plurality of pad patterns to the patch pattern.

As described above, as a technique of communications of portable terminal devices has been developed from 4G to 5G, a band used for communications has been designed to be wide-range and multi-band. As mmWave is used, a physical size of a receiver should be decreased, and an antenna used in a portable terminal device should have increased efficiency to implement a wideband and should have a reduced size at the same time. In accordance with the trend, an antenna which is generally manufactured as a printed circuit board (PCB) having a multilayer structure may be manufactured as a chip-type antenna using a high-k material to reduce a size thereof, and a rigid-flexible PCB may be employed to increase efficiency such that radiation properties may increase.

When a chip patch antenna is implemented, a size of an antenna may be reduced by using a layer having a high dielectric constant (Dk), but the introduction of such a layer having a high dielectric constant may decrease radiation efficiency. To address the above-described issue, it may be considered to increase radiation efficiency by introducing a layer having a low dielectric constant between layers having high dielectric constant. For example, by introducing a layer having a low dielectric constant (Dk) to a portion which is less important in reduction of a size, an overall effective dielectric constant (Dk) of an antenna may decrease such that radiation efficiency may increase. In this case, as the element which has the most lowest dielectric constant (Dk) in a general environment may be air, it may be considered to form an air cavity in a layer having a low dielectric constant described above, an adhesive layer having a dielectric constant, for example. However, a bonding sheet, which may be generally used as an adhesive layer, may have relatively low strength such that a bonding sheet may have vulnerable reliability.

Differently from the above-described example, the antenna 100A in the example embodiment may be configured as a chip-type patch antenna including the body portion 110 and the pattern portion 120 formed in the body portion 110, and the body portion 110 may include the first and second dielectric layers 111 and 112 and the first and second adhesive layers 114 and 115 disposed between the first and second dielectric layers 111 and 112, and may further include the reinforcing layer 113 disposed between the first and second adhesive layers 114 and 115. A cavity 113H may be formed in the reinforcing layer 113. The reinforcing layer 113 may be configured as a dielectric layer which may adjust a dielectric constant (Dk) depending on a material thereof, and may have strength stronger than that of the first and second adhesive layers 114 and 115, and may have, for example, an elastic modulus greater than those of the first and second adhesive layers 114 and 115. Accordingly, the antenna 100A configured as above may have improved antenna performance (e.g., gain, a bandwidth, directivity, a transmission and reception rate, a radiation rate, and the like), and may stably obtain the above-described performance, and may also have improved reliability.

The reinforcing layer 113 may have one or more venting holes 113h connected to the cavity 113H on a plane and exposed to an external side surface of the reinforcing layer 113. The reinforcing layer 113 may have a plurality of the venting holes 113h, and the venting holes 113h may be disposed in different regions. The venting hole 113h may provide an air moving path of the cavity 113H when the antenna 100A receives stress causing changes in volume of the cavity 113H, thereby reducing an effect of the stress applied to the antenna 100A. Accordingly, a phenomenon in which a size or a shape of the cavity 113H does not match a designed size and shape may be reduced, or a factor which physically affects the first and second adhesive layers 114 and 115 and the reinforcing layer 113 may be reduced, in a process of manufacturing the antenna 100A. Accordingly, improved performance (a bandwidth relative to a size, and gain) may be stably obtained based on the cavity 113H.

In the description below, the elements of the antenna 100A of the example embodiment will be described in greater detail with reference to the drawings.

The first dielectric layer 111, the first adhesive layer 114, the reinforcing layer 113, the second adhesive layer 115, and the second dielectric layer 112 included in the body portion 110, and the first pattern layer 121 and the second pattern layer 122 included in the pattern portion 120 may be configured to be sequentially layered. The above-described structure may be implemented by, for example, a layering process in which the first and third pattern layers 121 and 123 may be formed on an upper surface and a lower surface of the first dielectric layer 111, respectively, the first adhesive layer 114 may be layered on the first dielectric layer 111 (e.g., to cover and embed the first pattern layer 121), the reinforcing layer 113 may be layered on the first adhesive layer 114, the second adhesive layer 115 may be layered on the reinforcing layer 113, and the second dielectric layer 112, on an upper surface of which the second pattern layer 122 is formed, may be layered on the second adhesive layer 115. The layering process may improve matching properties among the pattern layers 121, 122, and 123 formed on the different layers as compared to a matching process, and accordingly, antenna performance may improve.

The higher the dielectric constants of the first and second dielectric layers 111 and 112, the shorter the wavelength of a radio frequency (RF) signal transmitted or propagated around the first and second dielectric layers 111 and 112 may be. The shorter the wavelength of an RF signal, the smaller the sizes of the first and second dielectric layers 111 and 112 may be, and accordingly, the antenna 100A may have a reduced size. The smaller the size of the antenna 100A, the greater the number of the antenna 100A which may be arranged in a unit volume on an antenna substrate may be. The greater the number of antennas 100A may be arranged in a unit volume, overall gain or a maximum output relative to a unit volume of the plurality of antennas 100A may further increase. Thus, the higher the dielectric constant of the first and second dielectric layers 111 and 112, the more the performance of the antenna 100A relative to a size may efficiently improve.

The first and second dielectric layers 111 and 112 may be spaced apart from each other. Accordingly, a space between the first and second dielectric layers 111 and 112 may be formed of air or a medium having a dielectric constant lower than those of the first and second dielectric layers 111 and 112. Accordingly, a space between the first and second dielectric layers 111 and 112 and a boundary surface between the first dielectric layers 111 may form a first dielectric boundary condition, and a space between the first and second dielectric layers 111 and 112 and a boundary surface between the second dielectric layers 112 may form a second dielectric boundary condition. As the first and second dielectric boundary conditions may refract an RF signal, radiation through a patch pattern and/or a coupling pattern may be focused in an upward and downward direction (e.g., a z direction), and accordingly, gain of the antenna 100A may improve.

A dielectric constant (Dk) of each of the first and second dielectric layers 111 and 112 may be 6 or greater, and dielectric constants (Dk) of the first and second dielectric layers 111 and 112 may be the same as or different from each other. The first and second dielectric layers 111 and 112 may include a material having a high dielectric constant (Dk). For example, each of the first and second dielectric layers 111 and 112 may include an organic binder and an inorganic filler. As the organic binder, various types of polymers such as PTFE, epoxy, and the like, may be used, and desirably, PTFE may be used. As the inorganic filler, various types of ceramic fillers such as silicon dioxide ($SiO_2$), titanium dioxide ($TiO_2$), aluminum oxide ($Al_2O_3$), or the like, may be used. The ceramic filler may have various shapes such as an angular shape, a circular shape, or the like, and may have various sizes, having a diameter of 50 μm or less.

For example, each of the first and second dielectric layers 111 and 112 may include a ceramic-polymer composite. Such a composite may have high dielectric constant properties by adjusting a content of ceramic filler, and may secure a significant level of handleability and workability. For example, a large area process may be available as handleability improves. Also, as processability improves, a via process using a computer numerical control (CNC) drill or laser may easily be performed. Accordingly, a design rule may improve such that implementation of a fine circuit through a plating process, for example, may be available, and a via hole 124v having a reduced diameter may be applied. Thus, advantages of a chip-type patch antenna may be obtained, and various issues according to a defect in handleability and processability may be addressed.

Each of the first and second dielectric layers 111 and 112 may further include a reinforcing material. As a reinforcing material, woven glass fiber may be used, for example. For example, each of the first and second dielectric layers 111 and 112 may include a ceramic-polymer composite impregnated in woven glass fiber. Such a composite including woven glass fiber may have improved strength. Accordingly, improved handleability and processability may be secured.

A material of the first and second dielectric layers 111 and 112 is not limited to the above-described material, and the first and second dielectric layers 111 and 112 may be configured as a layer having a high dielectric constant formed of a different material. For example, the first and second dielectric layers 111 and 112 may be formed of a material having a relatively high dielectric constant, such as ceramic materials including a low temperature co-fired ceramic (LTCC), a material having a relatively high dielectric constant such as a glass material, or a material such as Teflon, and may further include at least one of magnesium (Mg), silicon (Si), aluminum (Al), calcium (Ca), and titanium (Ti) such that the first and second dielectric layers 111 and 112 may have an increased dielectric constant or improved durability. For example, the first and second dielectric layers 111 and 112 may include $Mg_2SiO_4$, $MgAlO_4$, or $CaTiO_3$.

The reinforcing layer 113 may be a dielectric layer, and may have strength. When a dielectric constant of at least a portion of the space between the first and second dielectric layers 111 and 112 is lower than a dielectric constant of the first and second adhesive layers 114 and 115, a bandwidth and gain of the antenna 100A against (or relative to) a size thereof may improve. Accordingly, the reinforcing layer 113 disposed between the first and second adhesive layers 114 and 115 may have the cavity 113H, and the cavity 113H may provide a dielectric medium (e.g., air) having a dielectric constant lower than those of the first and second adhesive layers 114 and 115, and accordingly, a bandwidth and gain of the antenna 100A relative to a size may improve. As a size and a shape of the cavity 113H may affect a resonant frequency or performance of the antenna 100A, the antenna 100A may have a structure which may reduce a phenomenon in which a size or a shape of the cavity 113H does not match a designed size and shape, thereby stably obtaining performance. By introducing the reinforcing layer 113, antenna performance may improve and performance of the antenna may be stably obtained, and reliability may also improve.

As the reinforcing layer 113 provides the cavity 113H, the reinforcing layer 113 may have relatively weak structural stability as compared to the example in which the reinforcing layer 113 does not provide the cavity 113H. For example, when the first and second dielectric layers 111 and 112 are adhered to the reinforcing layer 113 by the first and second adhesive layers 114 and 115 in a process of manufacturing the antenna 100A, the antenna 100A may receive stress which may cause changes in volume of the cavity 113H, the stress may distort a size or a shape of the cavity 113H or may cause cracks in the first and second dielectric layers 111 and 112. Thus, as the antenna 100A may have a structure which may reduce factors physically affecting the reinforcing layer 113 in a process of manufacturing the antenna 100A, the antenna 100A may stably maintain performance parameters.

For example, the reinforcing layer 113 may be connected to the cavity 113H on a plane and may have one or more venting holes 113h exposed to an external side surface of the reinforcing layer 113. The venting hole(s) 113h may provide an air moving path to and from the cavity 113H when the antenna 100A receives stress causing changes in volume of the cavity 113H, thereby reducing an effect of the stress applied to the antenna 100A. Accordingly, a phenomenon in which a size or a shape of the cavity 113H does not match a designed size and shape may be reduced, or a factor which physically affect the reinforcing layer 113 may be reduced, in a process of manufacturing the antenna 100A. Accordingly, improved performance (a bandwidth relative to a size, and gain) may be stably obtained based on the cavity 113H. A plurality of the venting holes 113h may be provided, and the plurality of venting holes 113h may align with each other in a venting direction (e.g., an x direction and/or a y direction). Accordingly, efficiency of air movement relative to a width of the plurality of venting holes 113h may improve.

The reinforcing layer 113 may include a material having higher strength than that of the first and second adhesive layers 114 and 115. Also, the reinforcing layer 113 may include a material having a dielectric constant (Dk) relatively lower than those of the first and second adhesive layers 114 and 115. For example, the reinforcing layer 113 may include an insulating material, an organic binder and inorganic filler, for example, and the reinforcing layer 113 may have a dielectric constant (Dk) relatively lower than those of the first and second dielectric layers 111 and 112 by adjusting a content of an inorganic filler. As an organic binder, various types of polymers, such as PTFE, epoxy, or the like, may be used, and desirably, PTFE may be used. As the inorganic filler, various types of ceramic fillers such as silicon dioxide ($SiO_2$), titanium dioxide ($TiO_2$), aluminum oxide ($Al_2O_3$), or the like, may be used. The ceramic filler may have various shapes such as an angular shape, a circular shape, or the like, and may have various sizes, having a diameter of 50 μm or less. Also, a reinforcing material such as woven glass fiber may be employed in the above-described material such that the reinforcing layer 113 may have an elastic modulus higher than those of the first and second adhesive layers 114 and 115. For example, the reinforcing layer 113 may be a ceramic-polymer composite impregnated in woven glass fiber.

A material of the reinforcing layer 113 is not limited to the above-described materials, and may be configured as a dielectric layer having high strength, formed of a different material. For example, the reinforcing layer 113 may be formed of a material including a glass-based material, such as Teflon, and if desired, the reinforcing layer 113 may be formed of a substrate material such as prepreg. The reinforcing layer 113 may have a thickness less than those of the first and second dielectric layers 111 and 112 to implement improved antenna properties. Moreover, to implement improved stiffness, the reinforcing layer 113 may have a thickness greater than those of the first and second adhesive layers 114 and 115.

The first and second adhesive layers 114 and 115 may be adhered to the first and second dielectric layers 111 and 112 and the reinforcing layer 113 between the first and second dielectric layers 111 and 112 and the reinforcing layer 113. Accordingly, a phenomenon in which at least one of the first and second dielectric layers 111 and 112 and the reinforcing layer 113 is detached may be prevented, and a gap between the first and second dielectric layers 111 and 112 and the reinforcing layer 113 may be stably maintained. The first and second adhesive layers 114 and 115 may have a dielectric constant higher than that of air and less than those of the first and second dielectric layers 111 and 112. With the lower dielectric constant of the space between the first and second dielectric layers 111 and 112, the first and second dielectric boundary conditions of the first and second dielectric layers 111 and 112 may more greatly affect an RF signal, electro-magnetic coupling concentration between the patch pattern and the coupling pattern may further increase, and radiation through the patch pattern and/or the coupling pattern may be more focused in an upward and downward direction (e.g., a z direction).

The first adhesive layer 114 may include a material having a dielectric constant (Dk) lower than those of the first and second dielectric layers 111 and 112, and having adhesive force better than those of the first and second dielectric layers 111 and 112 and the reinforcing layer 113. For example, the first adhesive layer 114 may include polymer having a dielectric constant (Dk) lower than those of the first and second dielectric layers 111 and 112 and having adhesive force better than that of the first and second dielectric layers 111 and 112. As the polymer, LCP, PI, PTFE, epoxy, or the like, may be used, but an example embodiment thereof is not limited thereto. To implement improved antenna properties, the first adhesive layer 114 may have a thickness greater than those of the first and second dielectric layers 111 and 112.

The second adhesive layer 115 may include a material having a dielectric constant (Dk) greater than that of the first adhesive layer 114, and having adhesive force better than those of the first and second dielectric layers 111 and 112 and the reinforcing layer 113. For example, the second adhesive layer 115 may include polymer having a dielectric constant (Dk) greater than that of the first adhesive layer 114 and having adhesive force better than that of the first and second dielectric layers 111 and 112 and the reinforcing layer 113. As the polymer, LCP, PI, PTFE, epoxy, or the like, may be used, but an example embodiment thereof is not limited thereto. To implement improved antenna properties, the second adhesive layer 115 may have a thickness less than those of the first and second dielectric layers 111 and 112.

The first pattern layer 121 may include a metal material. As the metal material, copper (Cu), aluminum (Al), silver (Ag), tin (Sn), gold (Au), nickel (Ni), lead (Pb), titanium (Ti), or alloys thereof may be used. The first pattern layer 121 may include a patch pattern. The patch pattern may receive an RF signal through a feeding pattern and a feeding via in an antenna substrate and may transmit the RF signal in a thickness direction (a z-direction) when the antenna 100A is mounted on an antenna substrate, and may transfer the RF signal received in the thickness direction to an electronic component mounted on the antenna substrate, such as an RFIC, for example, through the feeding pattern and the feeding via disposed in the antenna substrate. The patch pattern may have an intrinsic resonant frequency according to intrinsic elements such as a shape, a size, a height, and dielectric constants of the dielectric layers 111 and 112, such as 28 GHz, 39 GHz, or the like, for example. For example, the patch pattern may be electrically connected to an electronic component, such as an RFIC, through the feeding pattern and the feeding via disposed in the antenna substrate, such that the patch pattern may transmit and receive a horizontal pole (H pole) RF signal and a vertical pole (V pole) RF signal, which are polarized to each other.

The second pattern layer 122 may also include a metal material. As the metal material, copper (Cu), aluminum (Al), silver (Ag), tin (Sn), gold (Au), nickel (Ni), lead (Pb), titanium (Ti), or alloys thereof may be used. The second pattern layer 122 may include a coupling pattern. The coupling pattern may be disposed on an upper side of the patch pattern, and may be disposed in a thickness direction (z-direction), for example, and may partially overlap the patch pattern on a plane. By electromagnetic coupling between the patch pattern and the coupling pattern, an additional resonant frequency proximate to the intrinsic resonant frequency described above may be obtained, and accordingly, a widened bandwidth may be obtained.

The third pattern layer 123 may also include a metal material. As the metal material, copper (Cu), aluminum (Al), silver (Ag), tin (Sn), gold (Au), nickel (Ni), lead (Pb), titanium (Ti), or alloys thereof may be used. The third pattern layer 123 may include a plurality of pad patterns. The plurality of pad patterns may connect the antenna 100A to an antenna substrate. For example, at least one of the plurality of pad patterns, a pad pattern connected to the patch pattern of the first pattern layer 121 through a feed via of the through-via layer 124, for example, may be connected to a feed pattern of an antenna substrate through a connector metal such as solder. Also, at least another one of the plurality of pad patterns, a pad pattern disposed around the above-described pad pattern, for example, may be connected to a ground pattern of an antenna substrate through a connector metal such as solder.

The through-via layer 124 may also include a metal material. As the metal material, copper (Cu), aluminum (Al), silver (Ag), tin (Sn), gold (Au), nickel (Ni), lead (Pb), titanium (Ti), or alloys thereof may be used. The through-via layer 124 may include a feed via connecting the patch pattern of the first pattern layer 121 to at least one of the plurality of pad patterns of the third pattern layer 123. However, an example embodiment thereof is not limited thereto, and if desired, the through-via layer 124 may further include a ground via for connecting the patch pattern of the pattern layer 121 to the other one of the plurality of pad patterns of the third pattern layer 123.

FIGS. 7A to 7F are enlarged cross-sectional diagrams illustrating various examples of region A illustrated in FIG. 6.

Figure 7A:
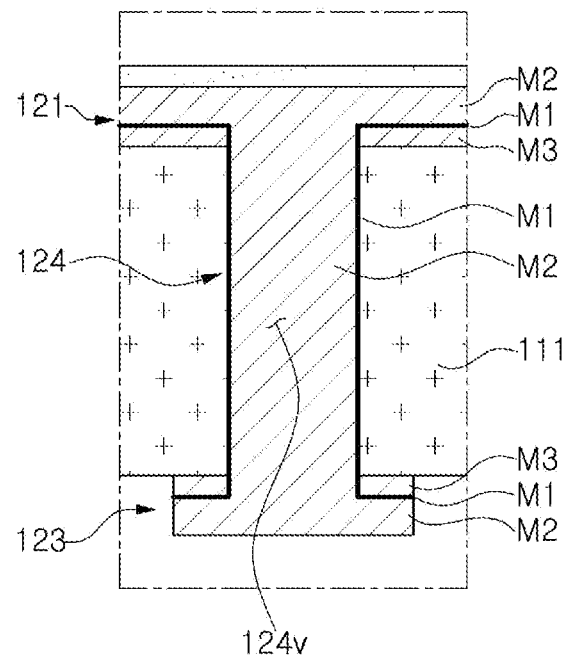
FIGS. 7A to 7F are enlarged cross-sectional diagrams illustrating various examples of region A illustrated in FIG. 6.

Referring to FIG. 7A, a first pattern layer 121, a third pattern layer 123, and a through-via layer 124 may be formed by a TT or an MSAP. In this case, each of the first pattern layer 121 and the third pattern layer 123 may include a first metal layer M1, i.e. a seed layer formed by an electroless plating process, a second metal layer M2, i.e. a plating layer formed by an electrolytic plating process, and a third metal layer M3, i.e. a metal foil, or the like. The through-via layer 124 may include the first metal layer M1, i.e. the seed layer formed by an electroless plating process, and the second metal layer M2, i.e. the plating layer formed by an electrolytic plating process.

For example, the first pattern layer 121 may include a first metal layer M1 disposed on an upper surface of the first dielectric layer 111, a second metal layer M2 disposed on the first dielectric layer 111, and a third metal layer M3 disposed between the upper surface of the first dielectric layer 111 and the first metal layer M1. The third pattern layer 123 may include a first metal layer M1 disposed on a lower surface of the first dielectric layer 111, a second metal layer M2 disposed on the first metal layer M1, and a third metal layer M3 disposed between the lower surface of the first dielectric layer 111 and the first metal layer M1. The through-via layer 124 may include a first metal layer M1 disposed on a wall of a via hole 124v formed in the first dielectric layer 111, and a second metal layer M2 disposed on the first metal layer M1. The second metal layer M2 may have a thickness greater than that of the first metal layer M1. The third metal layer M3 may have a thickness greater than that of the first metal layer M1, and less than a thickness of the second metal layer M2. The second metal layer M2 may fill the via hole 124v formed between the first metal layers M1 formed on opposite walls of the via hole 124v. For example, the feed via of the through-via layer 124 described above may be a filled-type via.

Figure 7B:
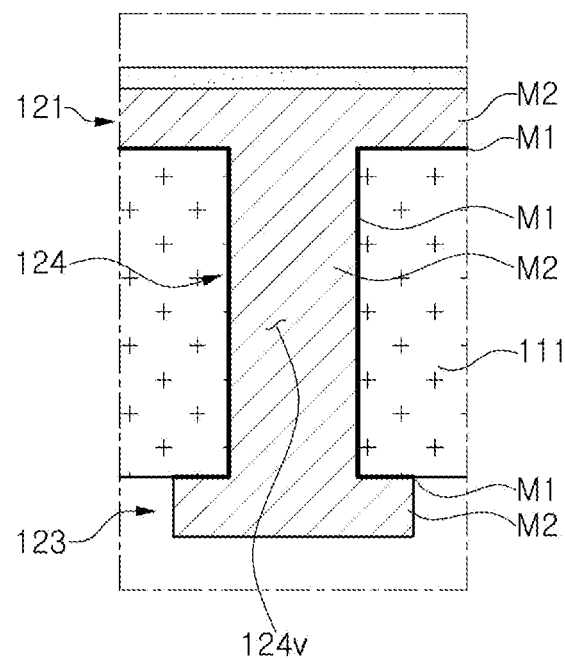

Referring to FIG. 7B, the first pattern layer 121, the third pattern layer 123, and the through-via layer 124 may alternatively be formed by an SAP. In this case, each of the first pattern layer 121 and the third pattern layer 123 may include a first metal layer M1 and a second metal layer M2 and may not include a third metal layer M3 described above. In other words, the first pattern layer 121 and the third pattern layer 123 may be formed by an electroless plating process and an electrolytic plating process without a metal foil.

For example, the first pattern layer 121 may include a first metal layer M1 disposed on an upper surface of the first dielectric layer 111, and a second metal layer M2 disposed on the first metal layer M1. The third pattern layer 123 may include a first metal layer M1 disposed on a lower surface of the first dielectric layer 111, and a second metal layer M2 disposed on the first metal layer M1. The through-via layer 124 may include a first metal layer M1 disposed on a wall of a via hole 124v formed in the first dielectric layer 111, and a second metal layer M2 disposed on the first metal layer M1. The second metal layer M2 may have a thickness greater than that of the first metal layer M1. The second metal layer M2 may fill the via hole 124v formed between the first metal layers M1. For example, the feed via of the through-via layer 124 described above may be a filled-type via.

Figure 7C:
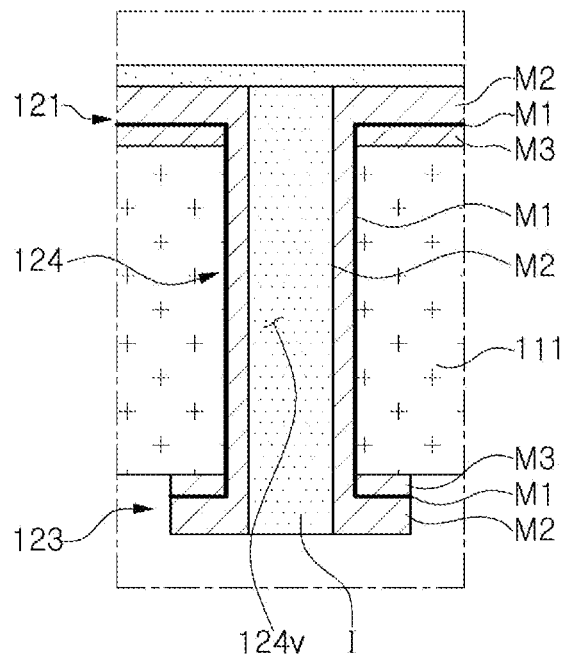
Figure 7D:
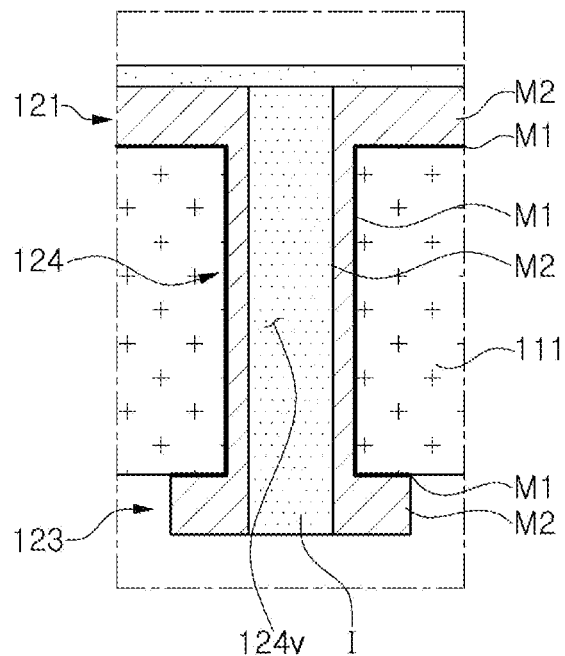

In the example embodiments illustrated in FIGS. 7C and 7D, the through-via layer 124 may include first and second metal layers M1 and M2, and the second metal layer M2 may be conformally disposed on the first metal layer M1, differently from the example embodiments in FIGS. 7A and 7B. In this case, the through-via layer 124 may further include an ink layer I filling a via hole 124v disposed between the second metal layers M2 formed on opposite walls of the via hole 124v. For example, the above-described feed via of the through-via layer 124 may be filled with ink. The ink layer I may be formed by an ink plugging process. As the ink layer I, a thermoplastic or thermosetting insulating material, or a generally used plugging material such as a conductive ink, may be employed.

The descriptions of the other elements are substantially the same as in the aforementioned example embodiments, and the detailed descriptions thereof will thus not be provided.

Figure 7E:
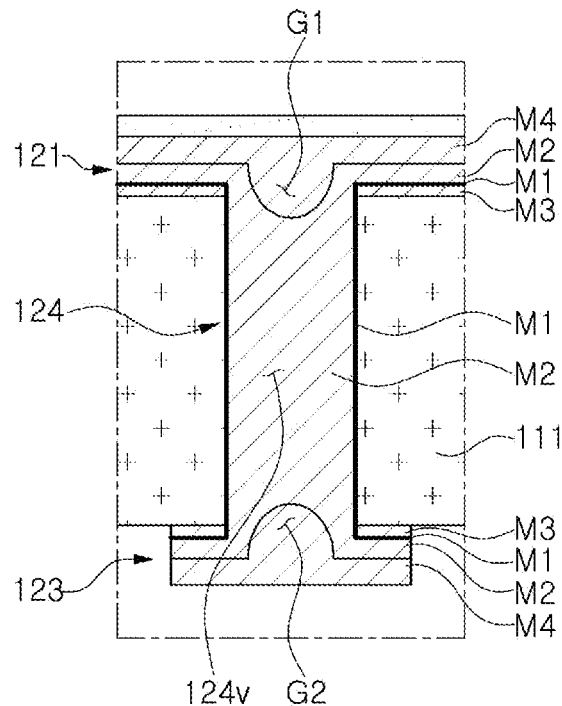
Figure 7F:
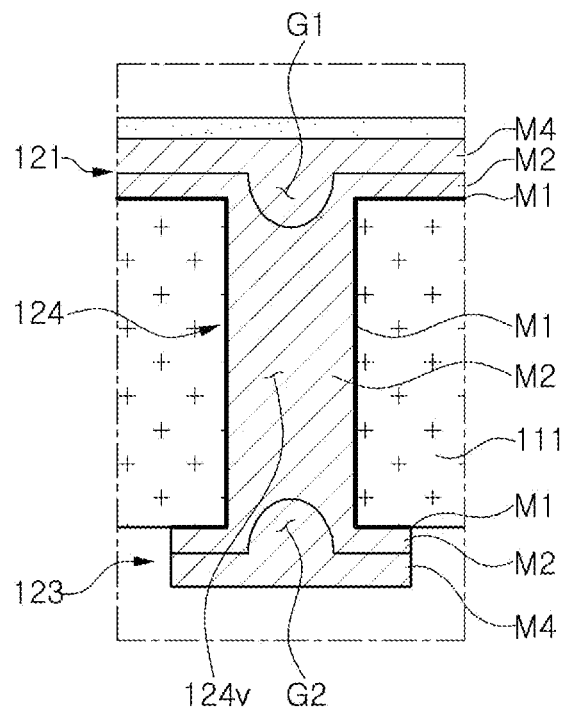

In FIGS. 7E and 7F, the through-via layer 124 may include first and second metal layers M1 and M2, and the second metal layer M2 may include first and second dimples G1 and G2 on an upper surface and a lower surface of the second metal layer M2, respectively, differently from FIGS. 7A and 7B. Also, the through-via layer 124 may further include a fourth metal layer M4 disposed on each of the upper surface and the lower surface of the second metal layer M2. The fourth metal layer M4 of the through-via layer 124 may fill the first and second dimples G1 and G2. The through-via layer 124 may have a central region and an upper region and a lower region with the central region interposed therebetween. Each of the upper region and the lower region may include a plurality of regions. An average grain size of a metal (e.g., an average grain size of metal particles) in the central region may be less than an average grain size of a metal (e.g., an average grain size of metal particles) in a partial region of the lower region and a partial region of the lower region. For example, the feed via of the through-via layer 124 described above may be a filled-type via. The through-via layer 124 may effectively prevent a void in a process of filling the via hole 124v by a plating process. Each of the first pattern layer 121 and the third pattern layer 123 may further include a fourth metal layer M4. The fourth metal layer M4 may have a thickness greater than a thickness of each of the first to third metal layers M1, M2, and M3.

For example, the second metal layer M2 may be formed by a pulse periodical reverse (PPR) electrolytic plating process in which a direction of a pulse current is periodically reversed. For example, the second metal layer M2 may be formed on the first metal layer M1 by applying a current by a PPR method. A waveform condition of the PPR may include more than one stage, e.g. five or more stages, for example, and current densities and the times in each of the stages may be the same as or may be different from each other. It may be desirable to maintain an average value Iavg of current density, closely related to a plating speed, to be 1.5 ASD or lower, in terms of maintaining control over a growth speed of plating grains described above. In this case, a growth speed of plating grains may be easily controlled to form the plurality of regions having the above-described average grain size, and accordingly, a phenomenon in which the supply of metal ions is insufficient in a process of forming a bridge layer by a plating process may be prevented such that formation of a void may be prevented. The fourth metal layer M4 may be formed by a direct current (DC) electrolytic plating process. For example, the fourth metal layer M4 may be formed on the second metal layer M2 through a plating process by the DC method.

The descriptions of the other elements are substantially the same as in the aforementioned example embodiment, and the detailed descriptions thereof will thus not be provided.

Figure 8A:
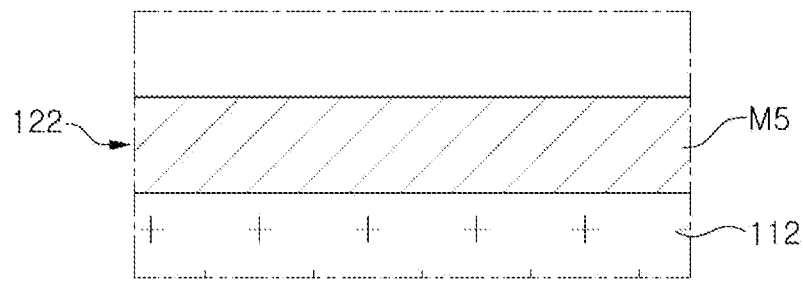
FIGS. 8A to 8C are enlarged cross-sectional diagrams illustrating various examples of region B illustrated in FIG. 6.
Figure 8B:
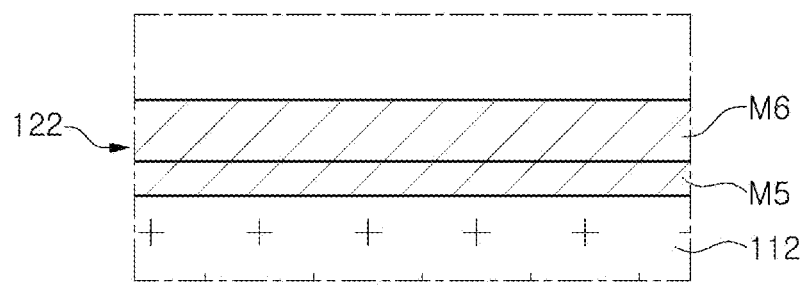
Figure 8C:
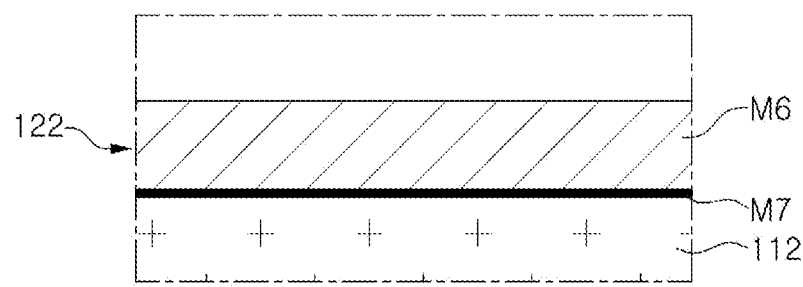

FIGS. 8A to 8C are enlarged cross-sectional diagrams illustrating various examples of region B illustrated in FIG. 6

Referring to FIG. 8A, a second pattern layer 122 may be formed by a plating process such as a TT, and accordingly, the second pattern layer 122 may only include a fifth metal layer M5, i.e. a metal foil. The fifth metal layer M5 may be disposed on an upper surface of the second dielectric layer 112. The fifth metal layer M5 may include a single metal element, such as rolled copper or electrolytic copper, for example.

Referring to FIG. 8B, the second pattern layer 122 may also be formed by an MSAP, and accordingly, the second pattern layer 122 may include the fifth metal layer M5, i.e. a metal foil, disposed on the upper surface of the second dielectric layer 112, and may further include a sixth metal layer M6 disposed on the fifth metal layer M5 by an electrolytic plating process based on the fifth metal layer M5 and having a thickness greater than that of the fifth metal layer M5.

Referring to FIG. 8C, the second pattern layer 122 may be formed by an SAP, and accordingly, the second pattern layer 122 may include a seventh metal layer M7, i.e. a seed layer formed on the upper surface of the second dielectric layer 112 by an electroless plating process, and a sixth metal layer M6 disposed on the seventh metal layer M7 by an electrolytic plating process based on the seventh metal layer M7 and having a thickness greater than that of the seventh metal layer M7.

The various examples of region A illustrated in FIGS. 7A to 7F may be combined with various examples of region B illustrated in FIG. 8A to 8C in various forms, and there may be no particular limitation in the combination.

Figure 9:
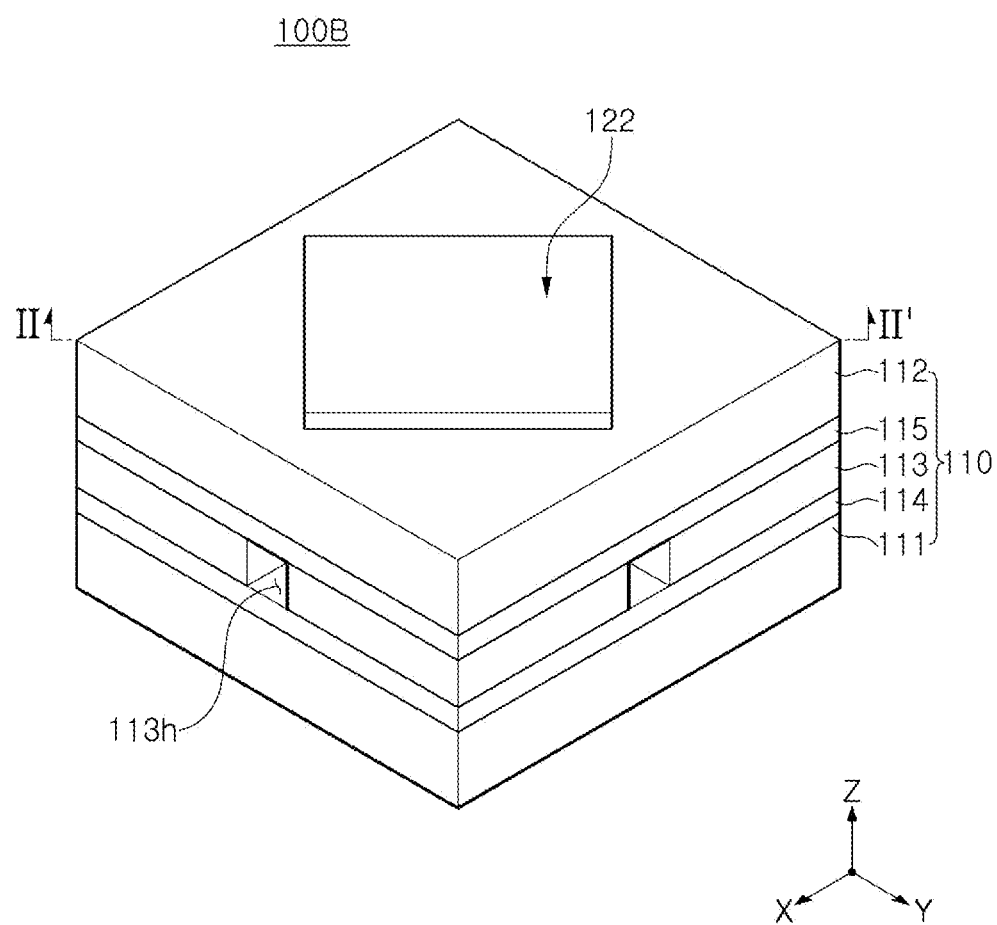
FIG. 9 is a perspective diagram illustrating another example of an antenna.

FIG. 9 is a perspective diagram illustrating another example of an antenna.

Figure 10:
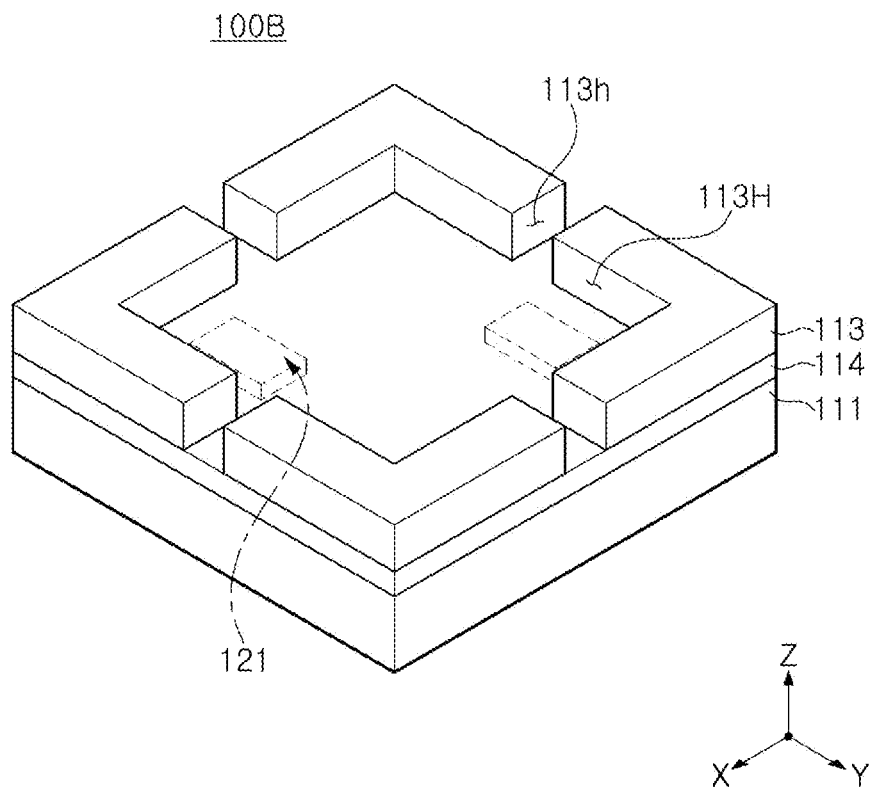
FIG. 10 is a perspective diagram illustrating an internal region of the antenna illustrated in FIG. 9.

FIG. 10 is a perspective diagram illustrating an internal region of the antenna illustrated in FIG. 9.

Figure 11:
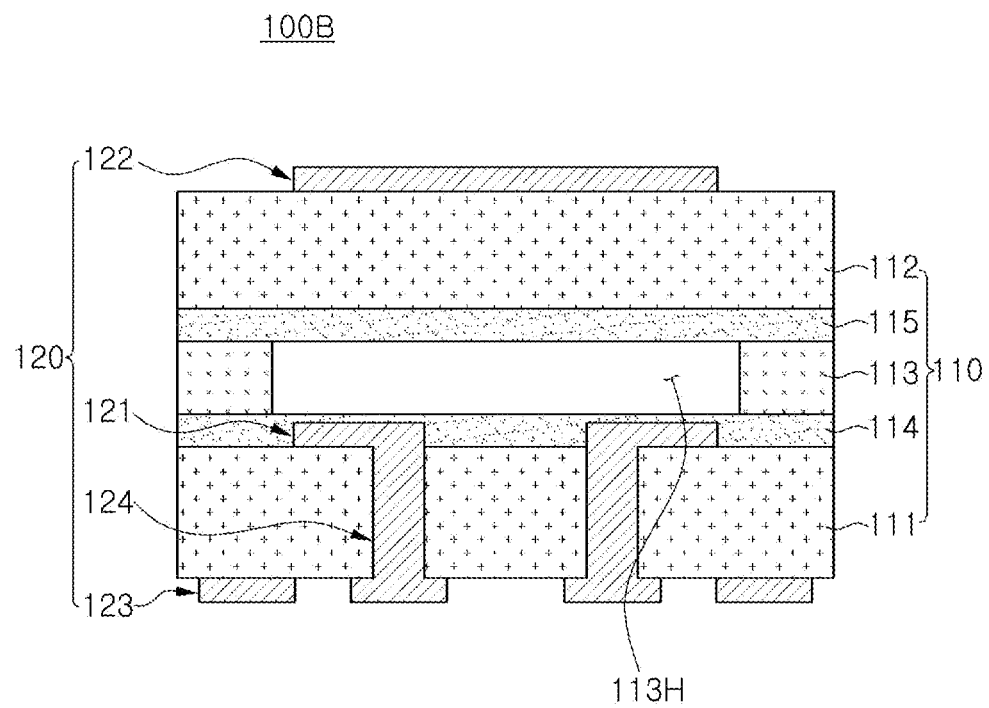
FIG. 11 is a cross-sectional diagram illustrating the antenna illustrated in FIG. 9 along line II-II'.

FIG. 11 is a cross-sectional diagram illustrating the antenna illustrated in FIG. 9 along line II-II'.

Referring to the diagrams, in an antenna 100B in another example embodiment, a first pattern layer 121 may include one or more feed patterns, a plurality of feed patterns, desirably, differently from the antenna 100A described in the aforementioned example embodiment. Also, a second pattern layer 122 may include a patch pattern. Also, a through-via layer 124 may include one or more feed vias (e.g., a plurality of feed vias, desirably) which connect one or more feed patterns (e.g., a plurality of feed patterns, desirably) to one or more pad patterns (e.g., a plurality of pad patterns, desirably) of the third pattern layer 123, respectively. Each of the one or more feed patterns of the first pattern layer 121 may have a planar area smaller than that of the patch pattern of the second pattern layer 122, and may partially overlap the patch pattern of the second pattern layer 122 on a plane in an upward and downward direction (e.g., a z direction).

As a relatively large upper surface of the patch pattern of the second pattern layer 122 may focus a radiation pattern in an upward and downward direction (e.g., a z direction), the patch pattern of the second pattern layer 122 may remotely transmit and/or receive an RF signal in an upward and downward direction, and may remotely transmit and/or receive an RF signal having a frequency within a bandwidth based on a resonant frequency of the patch pattern. The feed via of the through-via layer 124 may work as a feeding path of the patch pattern of the second pattern layer 122. In other words, the feed via of the through-via layer 124 may provide a path in which a surface current flowing in the patch pattern may flow when the patch pattern of the second pattern layer 122 remotely transmits and/or receives an RF signal. The feed pattern of the first pattern layer 121 may be electrically connected to the feed via of the through-via layer 124, and may be spaced apart from the patch pattern of the second pattern layer 122. The feed pattern of the first pattern layer 121 may also work as a feeding path of the patch pattern of the second pattern layer 122.

As the feed pattern of the first pattern layer 121 is spaced apart from the patch pattern of the second pattern layer 122, the patch pattern may be fed in a non-contact manner, and by using the non-contact feeding method, inductance based on the feed pattern and capacitance formed by the feed pattern and the patch pattern may work as an additional resonant frequency of the patch pattern, and thus, a bandwidth of the patch pattern may be widened. A non-contact feeding space in a general non-contact feeding method may cause a leakage of energy of radio waves. However, in another example embodiment, first and second dielectric boundary conditions formed by the first and second dielectric layers 111 and 112 may increase electromagnetic coupling concentration between the patch pattern of the second pattern layer 122 and the feed pattern of the first pattern layer 121, and thus, loss of energy caused by using a non-contact feeding method may be significantly reduced, and degradation of gain may be reduced. Thus, the antenna 100B may have widened bandwidth and increased gain relative to a size thereof.

The patch pattern of the second pattern layer 122 may be disposed such that sides of a quadrangular shape thereof are diagonally disposed with respect to sides of a cavity 113H. A surface current flowing in the patch pattern of the second pattern layer 122 may flow from one side of the quadrangle towards the other side. Moreover, when a plurality of the antennas 100B are disposed in proximity to each other, electromagnetic interference between the elements of the plurality of the antennas 100B may further increase when directions of surface currents of the plurality of antennas 100B overlap one another. In this case, when sides of the quadrangular shape of the patch pattern of the second pattern layer 122 are disposed diagonally with respect to sides of the cavity 113H, electromagnetic interference from a surface current of the patch pattern to an adjacent antenna 100B may be prevented.

If desired, the patch pattern of the second pattern layer 122 may have a quadrangular shape with chamfered vertices, and sides of the quadrangle may be disposed diagonally with respect to sides of the cavity 113H. As for the quadrangular shape of the patch pattern of the second pattern layer 122 with chamfered vertices, vertices of the patch pattern may be disposed adjacent to a central portion of a respective side such that the vertices of the patch pattern may not be disposed beyond the cavity 113H (e.g., no portion of the patch pattern of the second pattern layer 122 may overlap with the reinforcing layer 113). Accordingly, electromagnetic coupling concentration between the patch pattern of the second pattern layer 122 and the feed pattern of the first pattern layer 121 may improve.

If desired, the second pattern layer 122 may further include a plurality of coupling patterns arranged along sides of the quadrangular shape of the patch pattern of the second pattern layer 122 to surround the patch pattern. The plurality of coupling patterns of the second pattern layer 122 may be electromagnetically coupled to the patch pattern of the second pattern layer 122, and may thus contribute to addition of a resonant frequency and expansion of a bandwidth of the patch pattern, and may form capacitance with the feed pattern of the first pattern layer 121, thereby efficiently expanding a bandwidth of the patch pattern. Capacitance formed by the plurality of coupling patterns and the patch pattern of the second pattern layer 122 with the feed pattern of the first pattern layer 121 may be precisely adjusted according to adjustment of a length of the feed pattern. A relatively high dielectric constant of the second dielectric layer 112 may widen an adjustment range of capacitance formed by the plurality of coupling patterns and the patch pattern of the second pattern layer 122 with the feed pattern of the first pattern layer 121. Accordingly, the antenna 100B may efficiently widen a bandwidth, and may have a widened bandwidth relative to a size thereof.

The descriptions of the other elements are substantially the same as in the aforementioned example embodiment, and the detailed descriptions thereof will thus not be provided.

Figure 12:
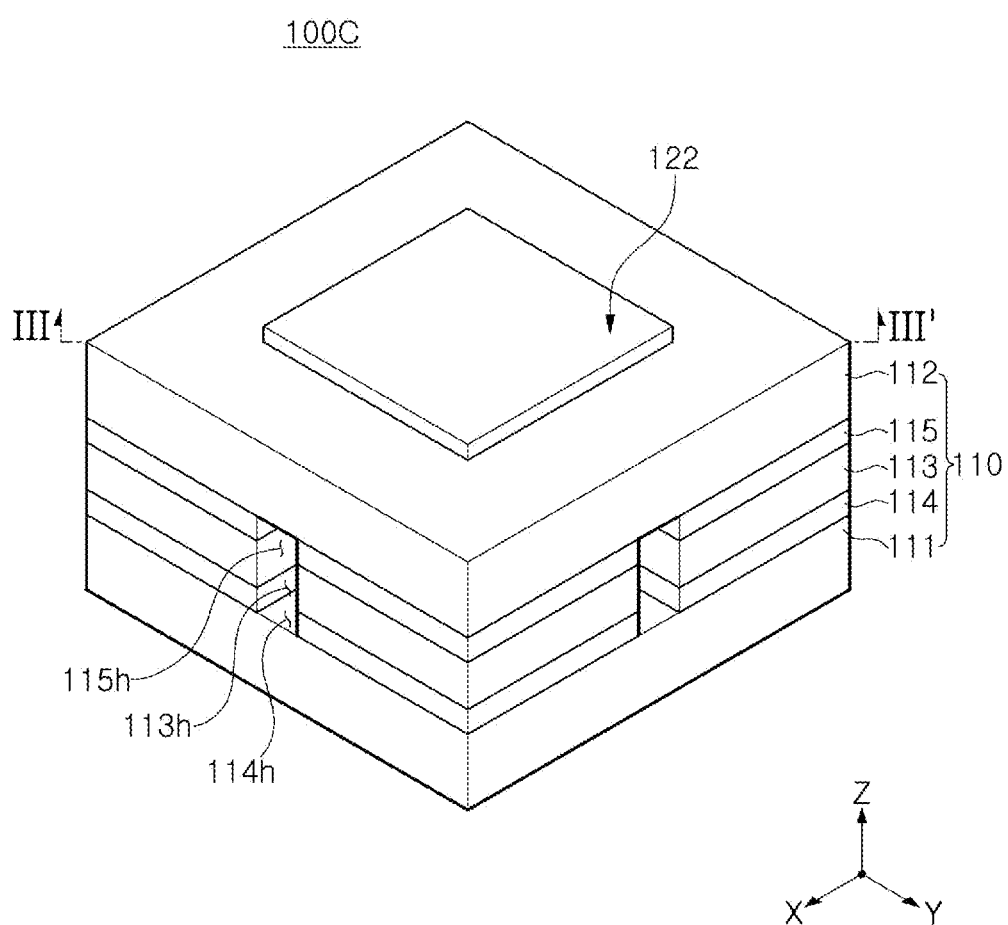
FIG. 12 is a perspective diagram illustrating another example of an antenna.

FIG. 12 is a perspective diagram illustrating another example of an antenna.

Figure 13:
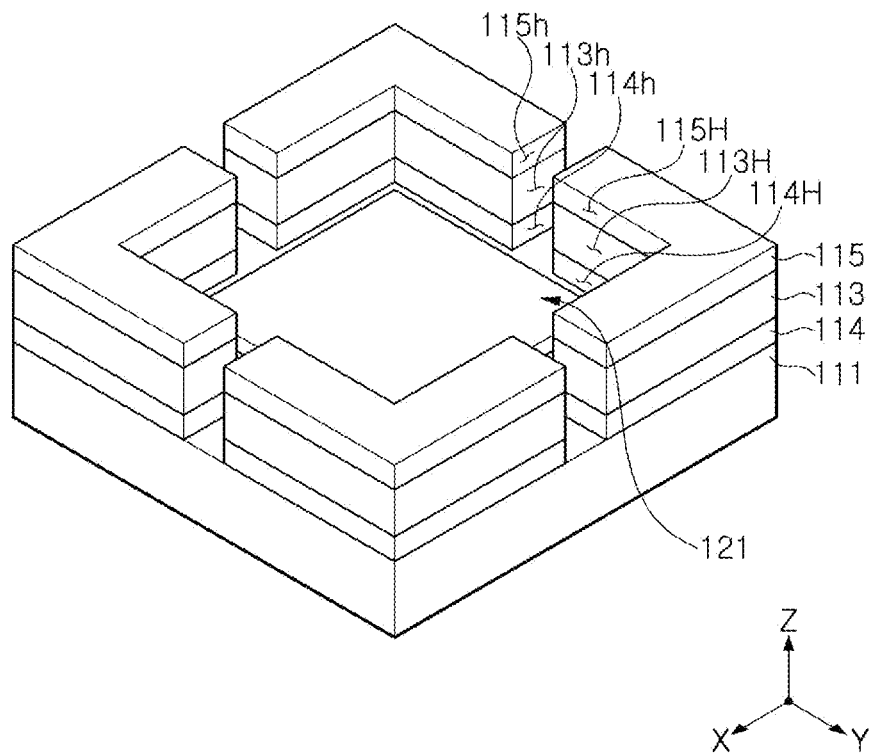
FIG. 13 is a perspective diagram illustrating an internal region of the antenna illustrated in FIG. 12.

FIG. 13 is a perspective diagram illustrating an internal region of the antenna illustrated in FIG. 12.

Figure 14:
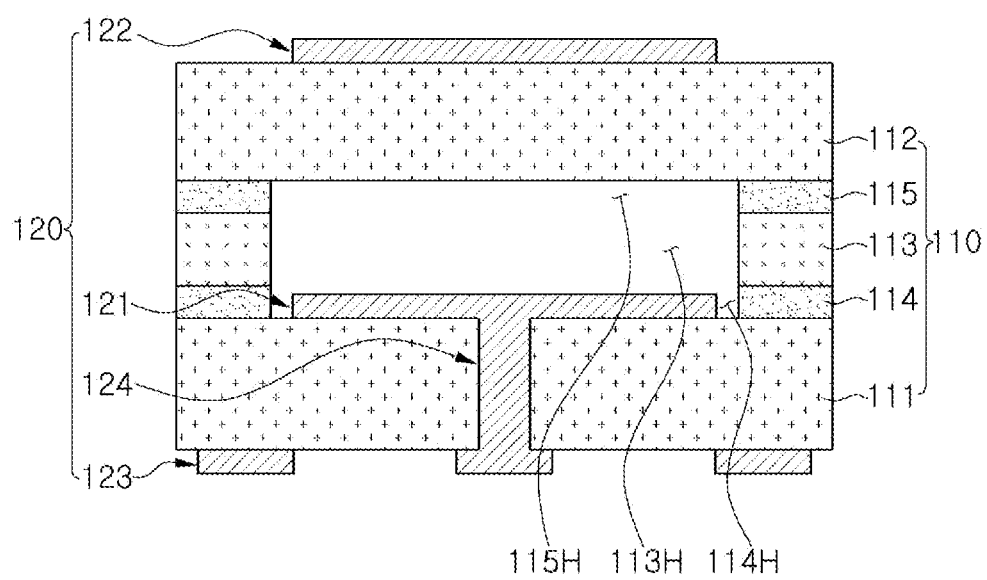
FIG. 14 is a cross-sectional diagram illustrating the antenna illustrated in FIG. 12 along line III-III'.

FIG. 14 is a cross-sectional diagram illustrating the antenna illustrated in FIG. 12 along line III-III'.

Referring to the diagrams, in an antenna 100C in another example embodiment, first and second adhesive layers 114 and 115 may have second and third cavities 114H and 115H penetrating the first and second adhesive layers 114 and 115 in a thickness direction (a z-direction), respectively, differently from the antenna 100A described in the aforementioned example embodiment. The second and third cavities 114H and 115H may be adjacent and connected to a cavity 113H in the thickness direction (a z-direction). Accordingly, a region between first and second dielectric layers 111 and 112 occupied by air may increase, and accordingly, radiation through a patch pattern and/or a coupling pattern may be more focused in an upward and downward direction (e.g., a z direction), and accordingly, gain of the antenna 100C may improve. At least a portion of the first pattern layer 121 may be disposed in the second cavity 114H, and may be surrounded by the first adhesive layer 114 on a plane.

The first and second adhesive layers 114 and 115 may have one or more second and third venting holes 114h and 115h connected to the second and third cavities 114H and 115H on a plane, respectively, and exposed to (e.g., extending to) external side surfaces of the first and second adhesive layers 114 and 115, respectively. The first and second adhesive layers 114 and 115 may have a plurality of second venting holes 114h and a plurality of third venting holes 115h, respectively, and the second and third venting holes 114h and 115h may be disposed in different regions. In each region, the first to third venting holes 113h, 114h, and 115h may be adjacent and connected to one another in the thickness direction (a z-direction). Accordingly, a phenomenon in which a size or a shape of each of the second and third cavities 114H and 115H does not match a designed size and shape may be reduced, or a factor which physically affect the first and second adhesive layers 114 and 115 may be reduced, in a process of manufacturing the antenna 100C, and accordingly, performance obtained by the second and third cavities 114H and 115H may be stably obtained.

In the diagram, as for the structure in which the first cavity 113H and the first venting hole 113h are formed in the reinforcing layer 113, both the second and third cavities 114H and 115H and the second and third venting holes 114h and 115h are additionally formed in the first and second adhesive layers 114 and 115, but an example embodiment thereof is not limited thereto. In other examples, only the second cavity 114H may be formed in the first adhesive layer 114 among the first and second adhesive layers 114 and 115, or only the third cavity 115H may be formed in the second adhesive layer 115 among the first and second adhesive layers 114 and 115. Also, only the second venting hole 114h may be formed in the first adhesive layer 114 among the first and second adhesive layers 114 and 115, or only the third venting hole 115h may be formed in the second adhesive layer 115 among the first and second adhesive layers 114 and 115.

The descriptions of the other elements are substantially the same as in the aforementioned example embodiment, and the detailed descriptions thereof will thus not be provided.

Figure 15:
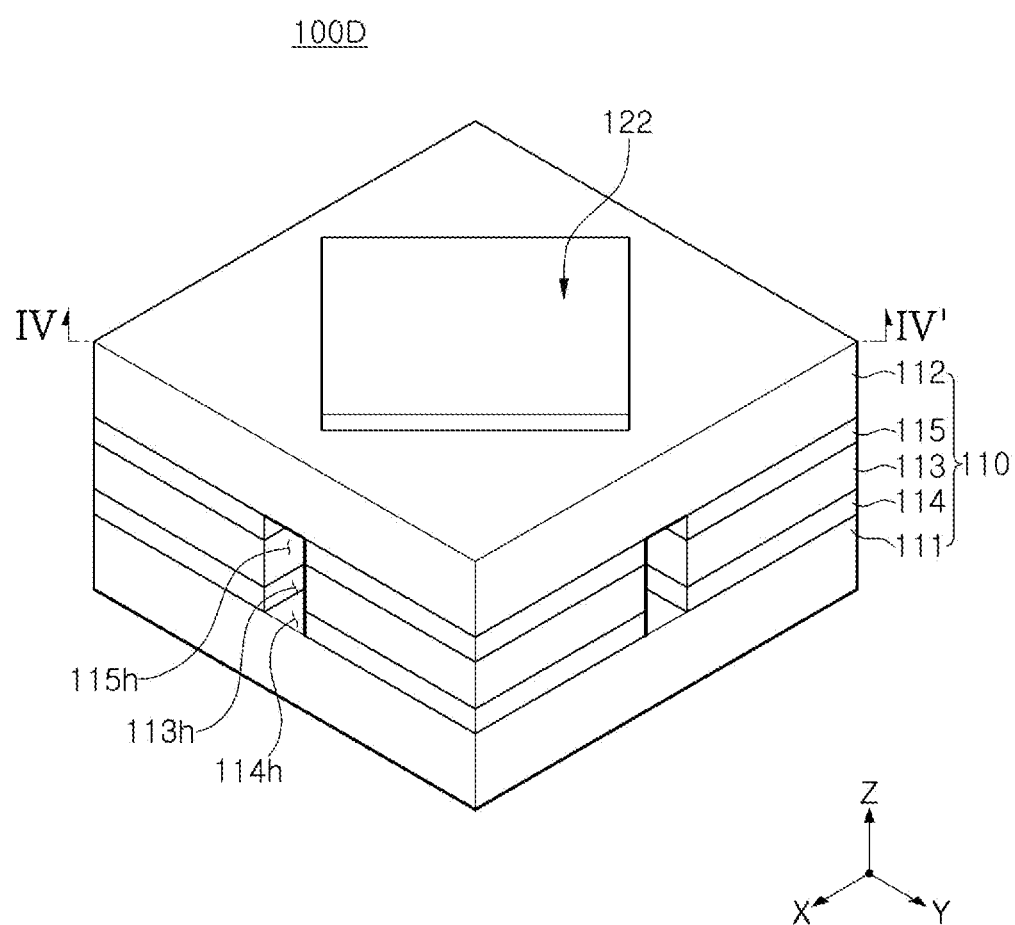
FIG. 15 is a perspective diagram illustrating another example of an antenna.

FIG. 15 is a perspective diagram illustrating another example of an antenna.

Figure 16:
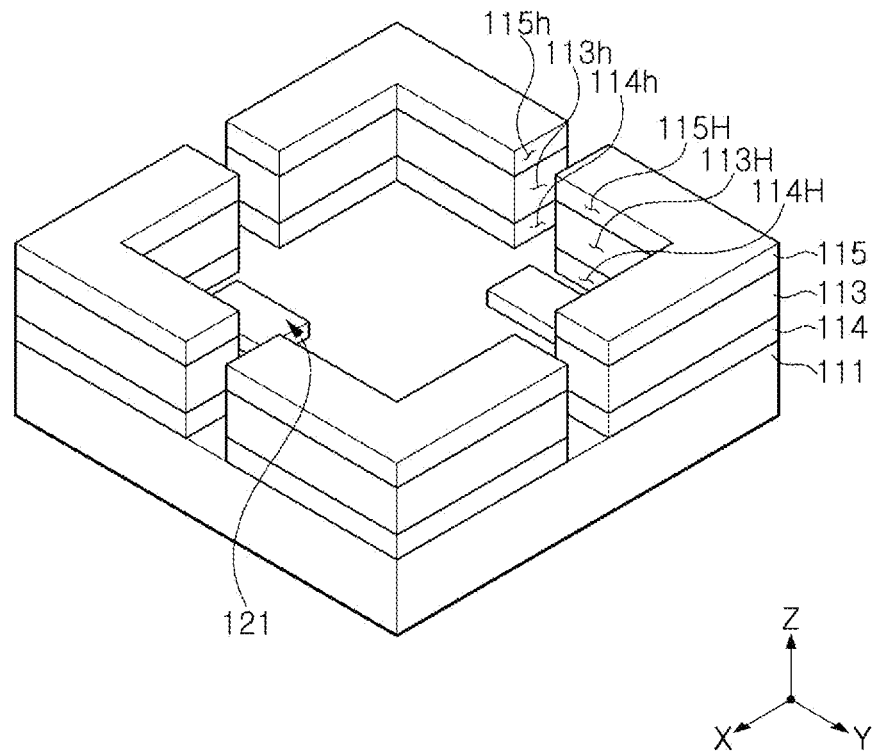
FIG. 16 is a perspective diagram illustrating an internal region of the antenna illustrated in FIG. 15.

FIG. 16 is a perspective diagram illustrating an internal region of the antenna illustrated in FIG. 15.

Figure 17:
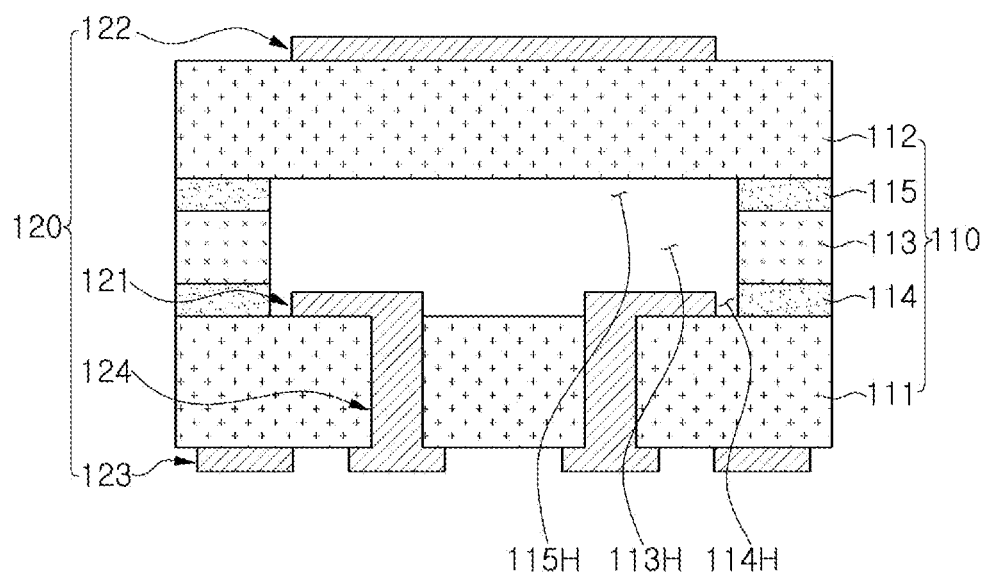
FIG. 17 is a cross-sectional diagram illustrating the antenna illustrated in FIG. 15 along line IV-IV'.

FIG. 17 is a cross-sectional diagram illustrating the antenna illustrated in FIG. 15 along line IV-IV'.

Referring to the diagram, in an antenna 100D in another example embodiment, a first pattern layer 121 may include one or more feed patterns, such as a plurality of feed patterns, desirably, differently from the antenna 100C described in the aforementioned example embodiment. Also, a second pattern layer 122 may include a patch pattern. Also, a through-via layer 124 may include one or more feed vias, a plurality of feed vias, desirably, which connect the one or more feed patterns (e.g., a plurality of feed patterns, desirably) to one or more pad patterns (e.g., a plurality of pad patterns, desirably) of the third pattern layer 123, respectively. Each of the one or more feed patterns (e.g., a plurality of feed patterns, desirably) of the first pattern layer 121 may have a planar area smaller than that of the patch pattern of the second pattern layer 122, and may partially overlap the patch pattern of the second pattern layer 122 on a plane.

The patch pattern of the second pattern layer 122 may be disposed such that sides of a quadrangular shape thereof are diagonally disposed with respect to sides of a cavity 113H (e.g., sides of the quadrangular second pattern layer 122 may be non-parallel to and non-orthogonal to sides of the cavity 113H). If desired, the patch pattern of the second pattern layer 122 may have a quadrangular shape with chamfered vertices, and sides of the quadrangle may be disposed diagonally with respect to sides of the cavity 113H. Also, the second pattern layer 122 may further include a plurality of coupling patterns arranged along sides of the quadrangular shape of the patch pattern of the second pattern layer 122 to surround the patch pattern.

The descriptions of the other elements are substantially the same as in the aforementioned example embodiments, and the detailed descriptions thereof will thus not be provided.

Figure 18:
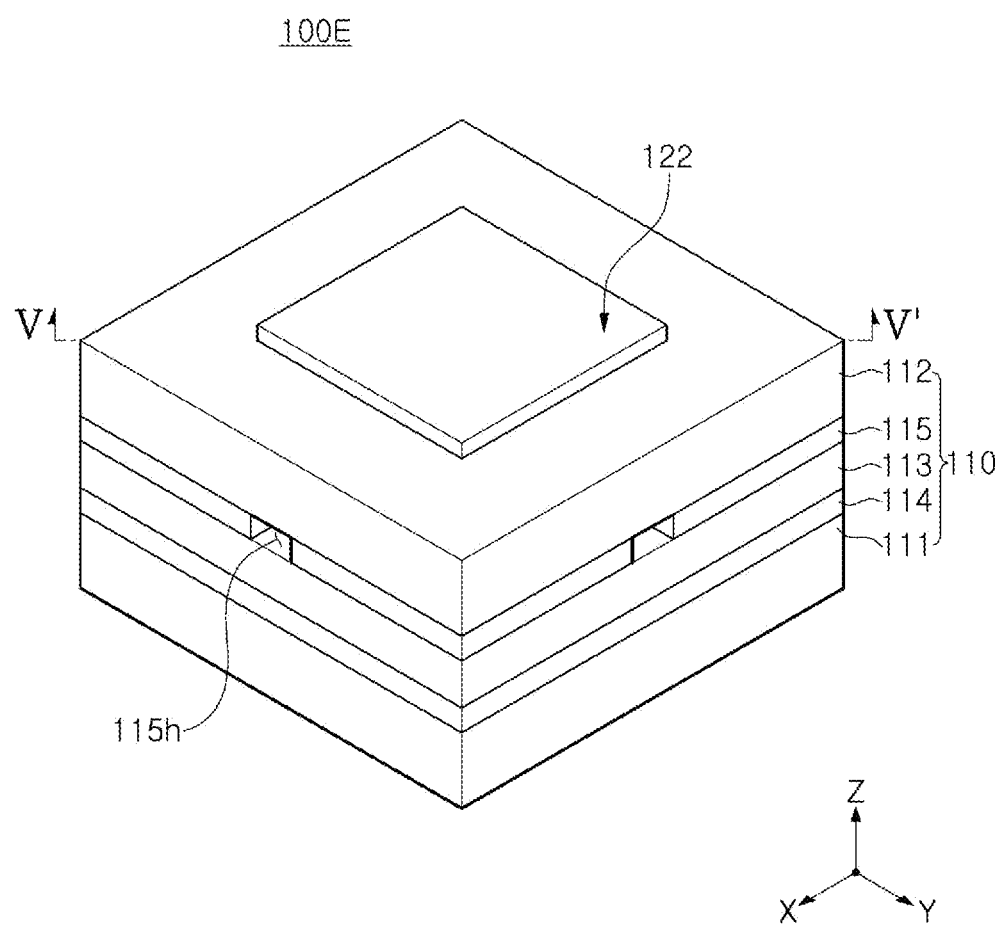
FIG. 18 is a perspective diagram illustrating another example of an antenna.

FIG. 18 is a perspective diagram illustrating another example of an antenna.

Figure 19:
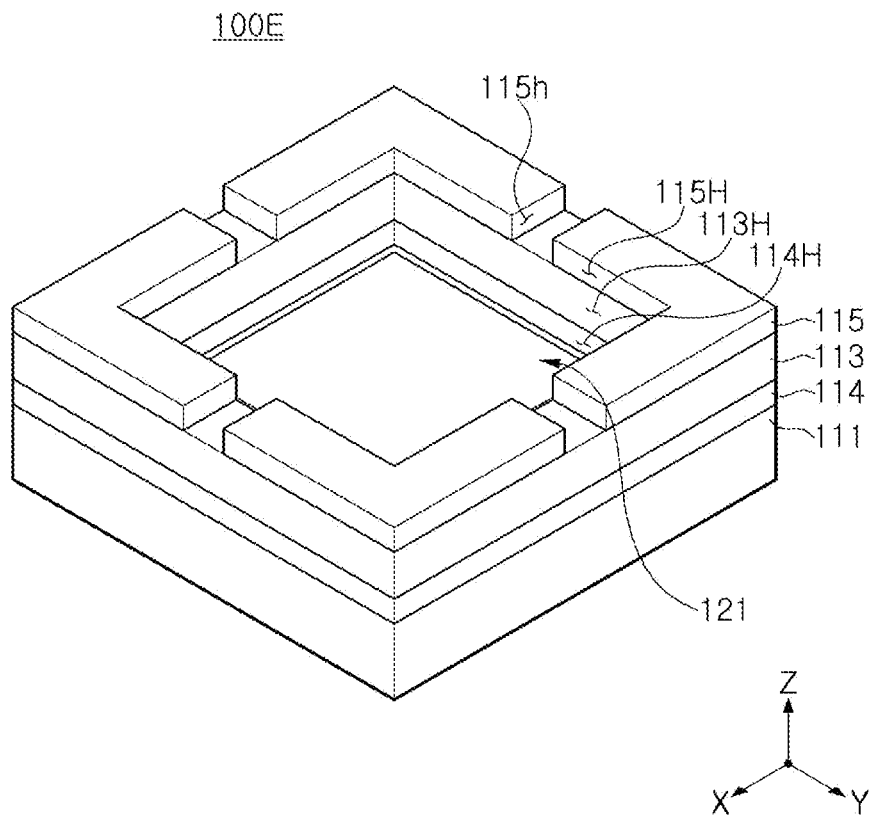
FIG. 19 is a perspective diagram illustrating an internal region of the antenna illustrated in FIG. 18.

FIG. 19 is a perspective diagram illustrating an internal region of the antenna illustrated in FIG. 18.

Figure 20:
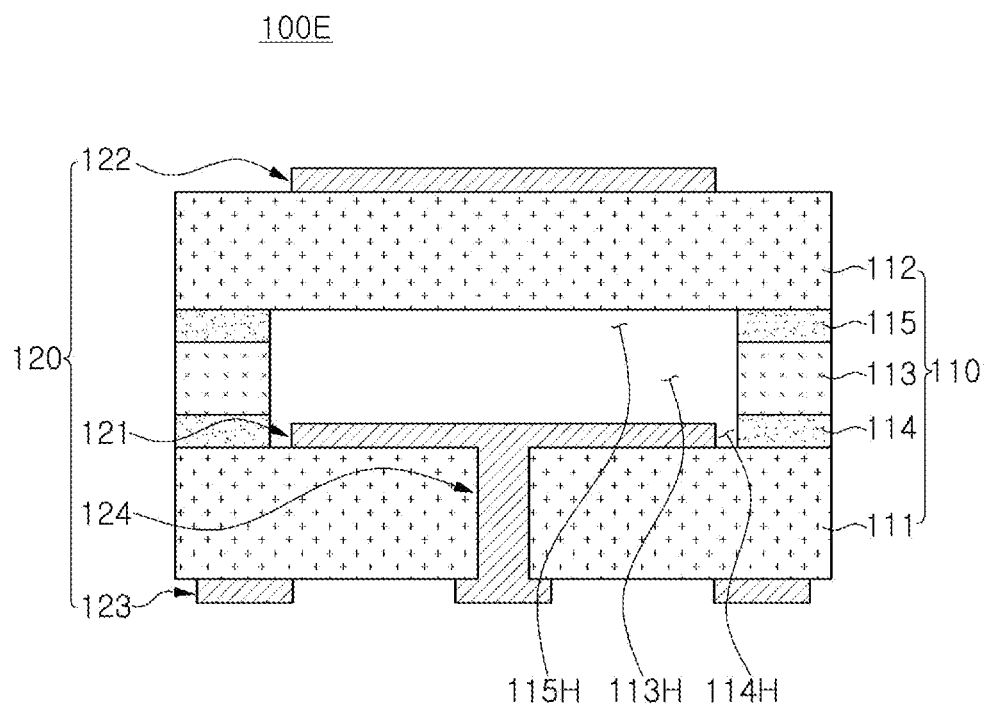
FIG. 20 is a cross-sectional diagram illustrating the antenna illustrated in FIG. 18 along line V-V'.

FIG. 20 is a cross-sectional diagram illustrating the antenna illustrated in FIG. 18 along line V-V'.

Referring to the diagrams, in an antenna 100E in another example embodiment, only a second adhesive layer 115 may have a third venting hole 115h, differently from the antenna 100C described in the aforementioned example embodiment. For example, when first to third cavities 113H, 114H, and 115H are formed in a reinforcing layer 113 and first and second adhesive layers 114 and 115, respectively, only the second adhesive layer 115 may have the third venting hole 115h, and each of the reinforcing layer 113 and the first adhesive layer 114 may not have a first venting hole 113h and a second venting hole 114h, respectively. As described above, a venting hole may be selectively formed.

In the example embodiment in the diagram, when the first to third cavities 113H, 114H, and 115H are formed in the reinforcing layer 113 and the first and second adhesive layers 114 and 115, respectively, only the second adhesive layer 115 may have the third venting hole 115h, but an example embodiment thereof is not limited thereto. Alternatively, only the first adhesive layer 114 may have the second venting hole 114h. As a further alternative, only the reinforcing layer 113 may have the first venting hole 113h.

The descriptions of the other elements are substantially the same as in the aforementioned example embodiments, and the detailed descriptions thereof will thus not be provided.

Figure 21:
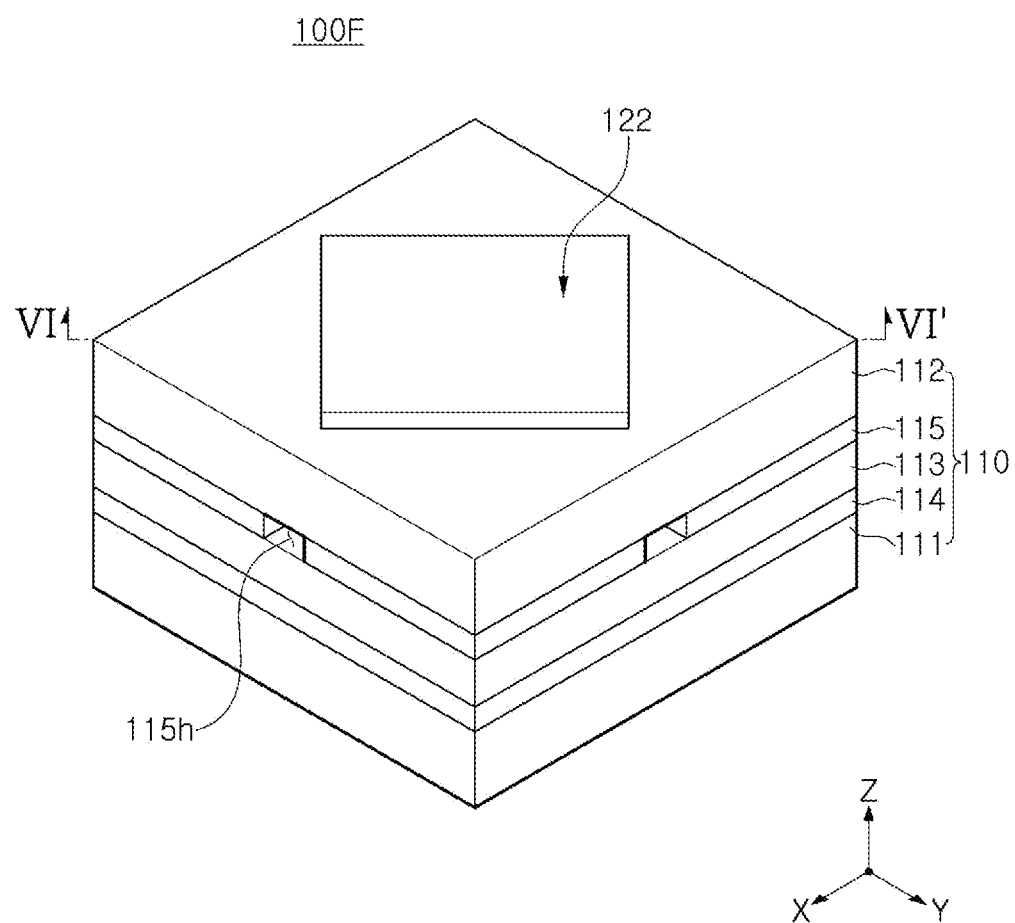
FIG. 21 is a perspective diagram illustrating another example of an antenna.

FIG. 21 is a perspective diagram illustrating another example of an antenna.

Figure 22:
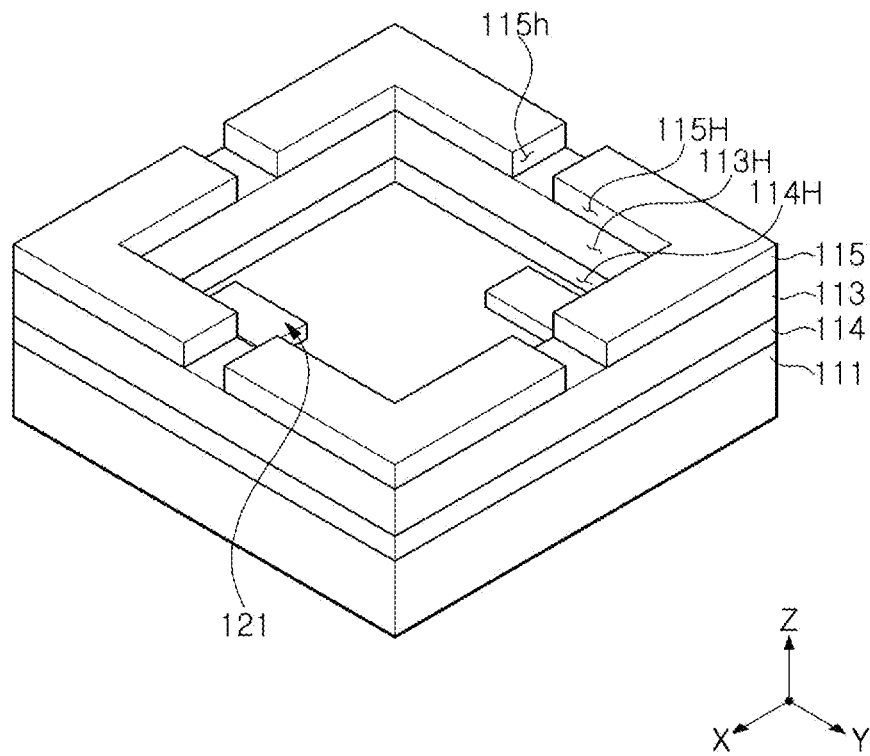
FIG. 22 is a perspective diagram illustrating an internal region of the antenna illustrated in FIG. 21.

FIG. 22 is a perspective diagram illustrating an internal region of the antenna illustrated in FIG. 21.

Figure 23:
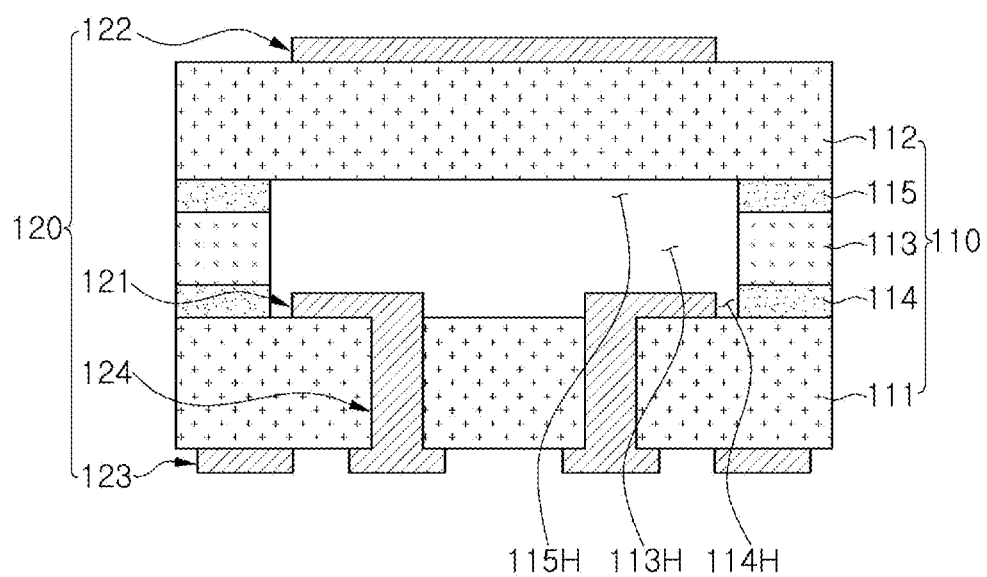
FIG. 23 is a cross-sectional diagram illustrating the antenna illustrated in FIG. 21 along line VI-VI'.

FIG. 23 is a cross-sectional diagram illustrating the antenna illustrated in FIG. 21 along line VI-VI'.

Referring to the diagrams, in an antenna 100F in another example embodiment, a pattern layer 121 may include one or more feed pattern, such as a plurality of feed patterns desirably, differently from the antenna 100E described in the aforementioned example embodiment. Also, a second pattern layer 122 may include a patch pattern. Also, a through-via layer 124 may include one or more feed vias, such as a plurality of feed vias desirably, which connect the one or more feed patterns, such as the plurality of feed patterns desirably, to one or more pad patterns, such as a plurality of pad patterns desirably, of the third pattern layer 123, respectively. Each of the one or more feed patterns (e.g., each of the plurality of feed patterns, desirably) of the first pattern layer 121 may have a planar area smaller than that of the patch pattern of the second pattern layer 122, and may partially overlap the patch pattern of the second pattern layer 122 in a stacking direction (e.g., z-direction).

The patch pattern of the second pattern layer 122 may be disposed such that sides of a quadrangular shape thereof are diagonally disposed with respect to sides of a cavity 113H (e.g., sides of the second pattern layer 122 may be non-parallel to and non-orthogonal to sides of the cavity 113H, and/or non-parallel to and non-orthogonal to sides of the dielectric layer 112). If desired, the patch pattern of the second pattern layer 122 may have a quadrangular shape with chamfered vertices, and sides of the quadrangle may be disposed diagonally with respect to sides of the cavity 113H. Also, the second pattern layer 122 may further include a plurality of coupling patterns arranged along sides of the quadrangular shape of the patch pattern of the second pattern layer 122 to surround the patch pattern.

The descriptions of the other elements are substantially the same as in the aforementioned example embodiment, and the detailed descriptions thereof will thus not be provided.

Figure 24:
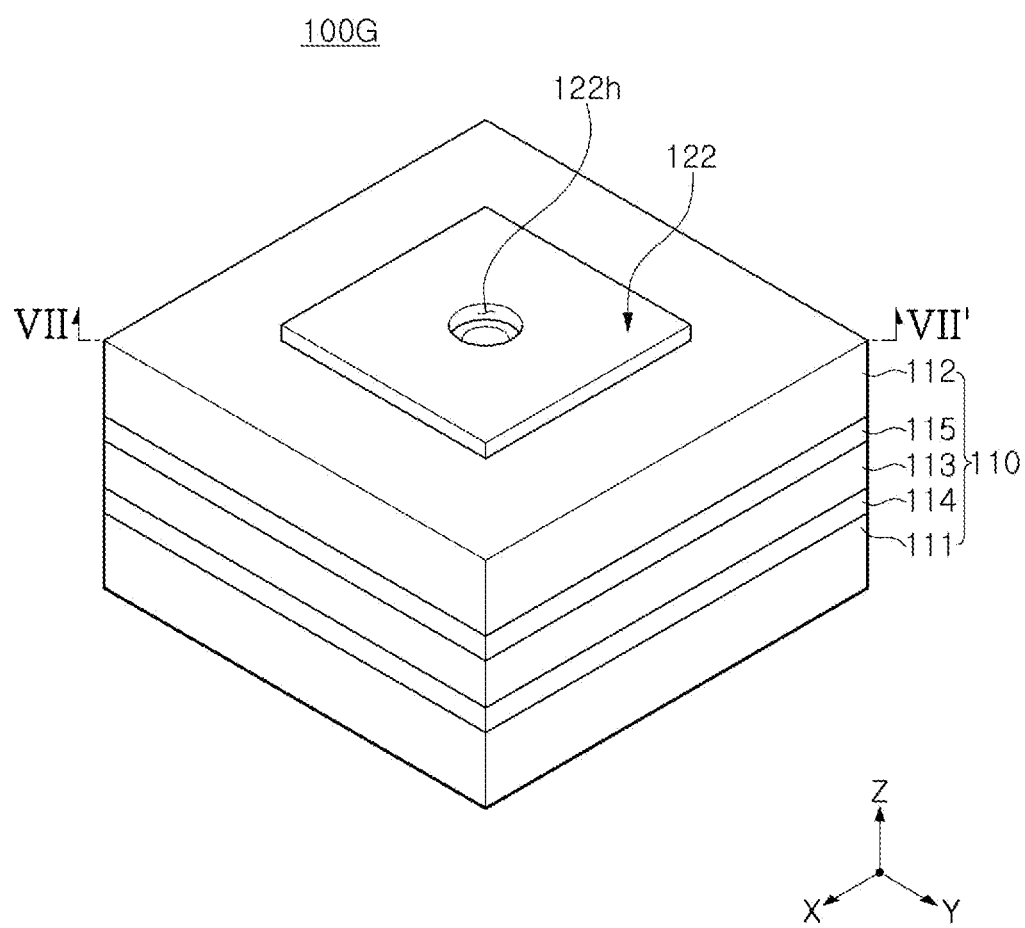
FIG. 24 is a perspective diagram illustrating another example of an antenna.

FIG. 24 is a perspective diagram illustrating another example of an antenna.

Figure 25:
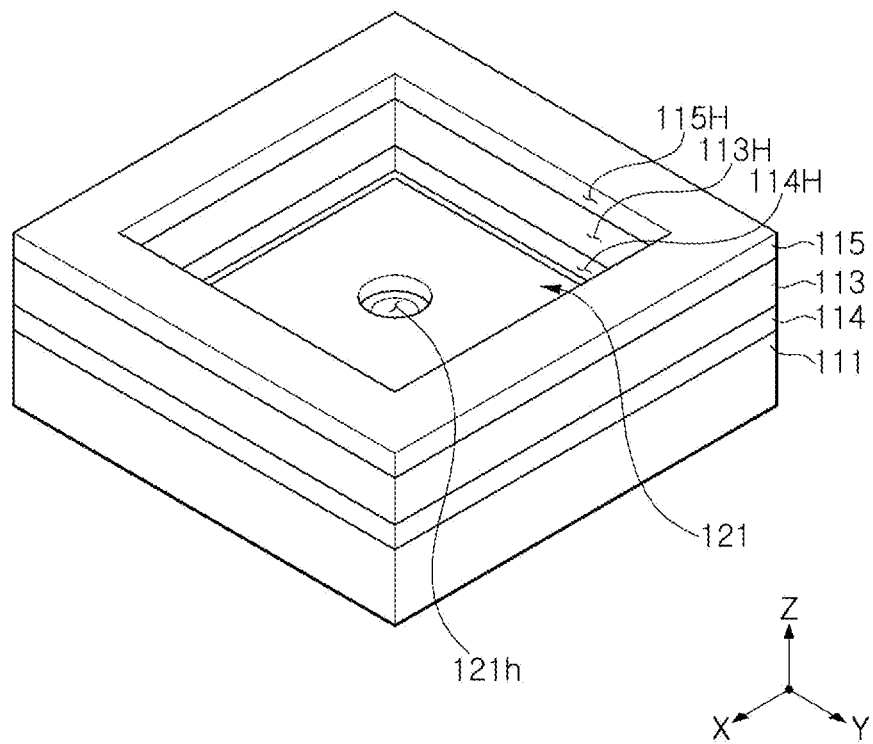
FIG. 25 is a perspective diagram illustrating an internal region of the antenna illustrated in FIG. 24.

FIG. 25 is a perspective diagram illustrating an internal region of the antenna illustrated in FIG. 24.

Figure 26:
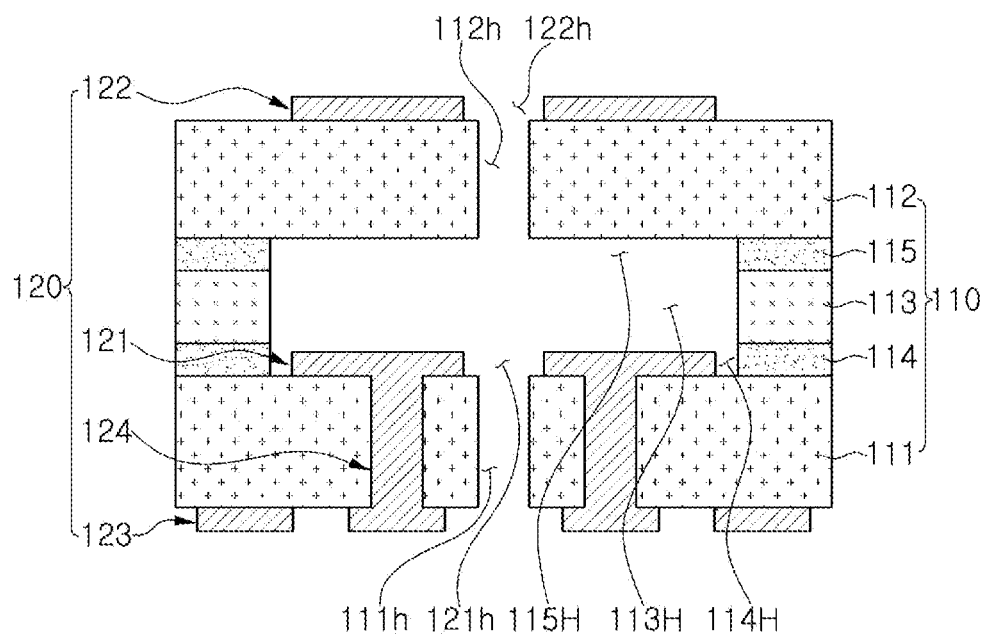
FIG. 26 is a cross-sectional diagram illustrating the antenna illustrated in FIG. 24 along line VII-VII'.

FIG. 26 is a cross-sectional diagram illustrating the antenna illustrated in FIG. 24 along line VII-VII'.

Referring to the diagrams, in an antenna 100G in another example embodiment, a first dielectric layer 111 may have a first through-hole 111h penetrating the first dielectric layer 111, differently from the antenna 100C described in the aforementioned example embodiment. Also, a second dielectric layer 112 may have a second through-hole 112h penetrating the second dielectric layer 112. The first and second through-holes 111h and 112h may be connected to second and third cavities 114H and 115H in a thickness direction (a z-direction), respectively. First to third venting holes 113h, 114h, and 115h may not be provided. The first and second through holes 111h and 112h may work as the first to third venting holes 113h, 114h, and 115h. For example, by including the first and second through holes 111h and 112h, a phenomenon in which a size or a shape of each of the first to third cavities 113H, 114H, and 115H does not match a designed size and shape may be reduced, or a factor which physically affect the first and second adhesive layers 114 and 115 may be reduced, in a process of manufacturing the antenna 100C, and accordingly, performance obtained by the first to third cavities 113H, 114H, and 115H may be stably obtained.

A patch pattern of a first pattern layer 121 may have a first pattern hole 121h aligned with and connected to the first through-hole 111h in the thickness direction (a z direction). Also, a coupling pattern of a second pattern layer 122 may have a second pattern hole 122h aligned with and connected to the second through-hole 112h in the thickness direction (a z direction). Accordingly, the effect obtained by the first and second through-holes 111h and 112h may be effectively implemented. A through-via layer 124 may include a feed via and a ground via, and the feed via and the ground via of the through-via layer 124 may be connected to the patch pattern of the first pattern layer 121. The feed via and the ground via of the through-via layer 124 may be connected to a pad pattern of a third pattern layer 123, which is for feeding, and a pad pattern for ground, respectively.

The descriptions of the other elements are substantially the same as in the aforementioned example embodiment, and the detailed descriptions thereof will thus not be provided.

Figure 27:
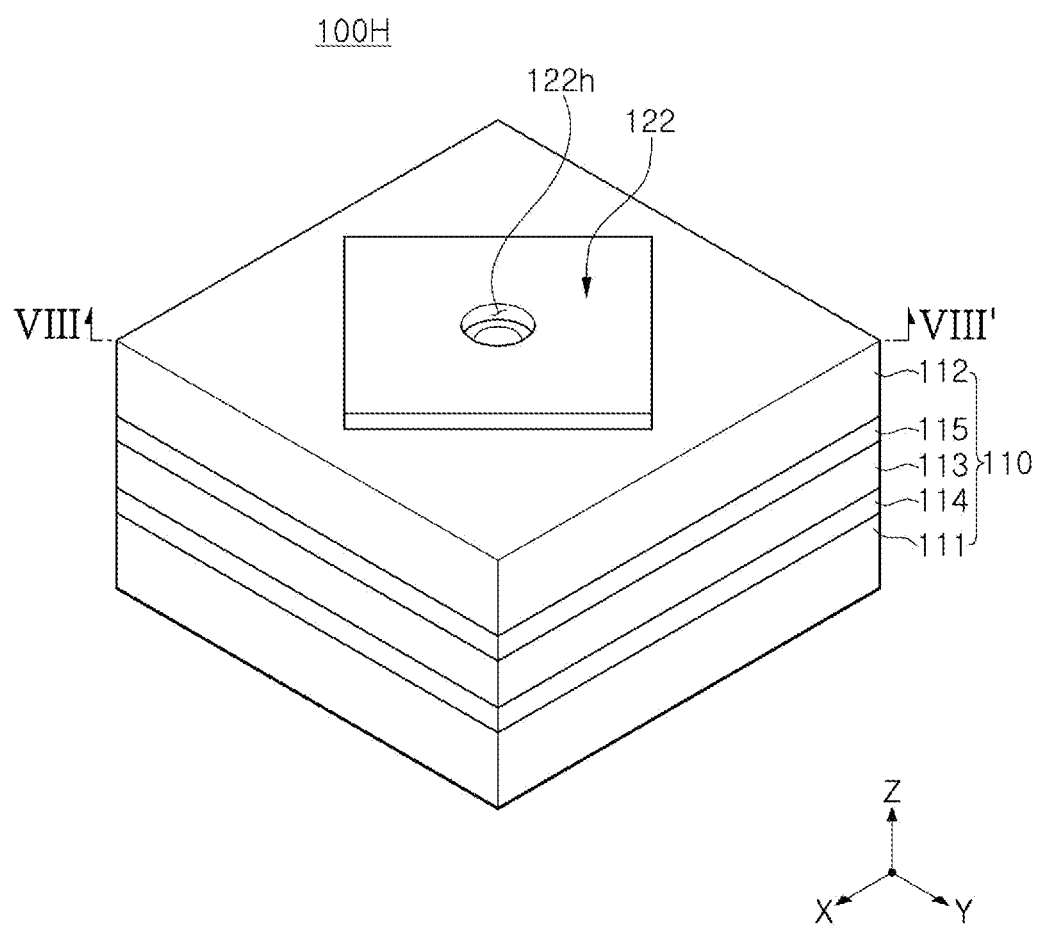
FIG. 27 is a perspective diagram illustrating another example of an antenna.

FIG. 27 is a perspective diagram illustrating another example of an antenna.

Figure 28:
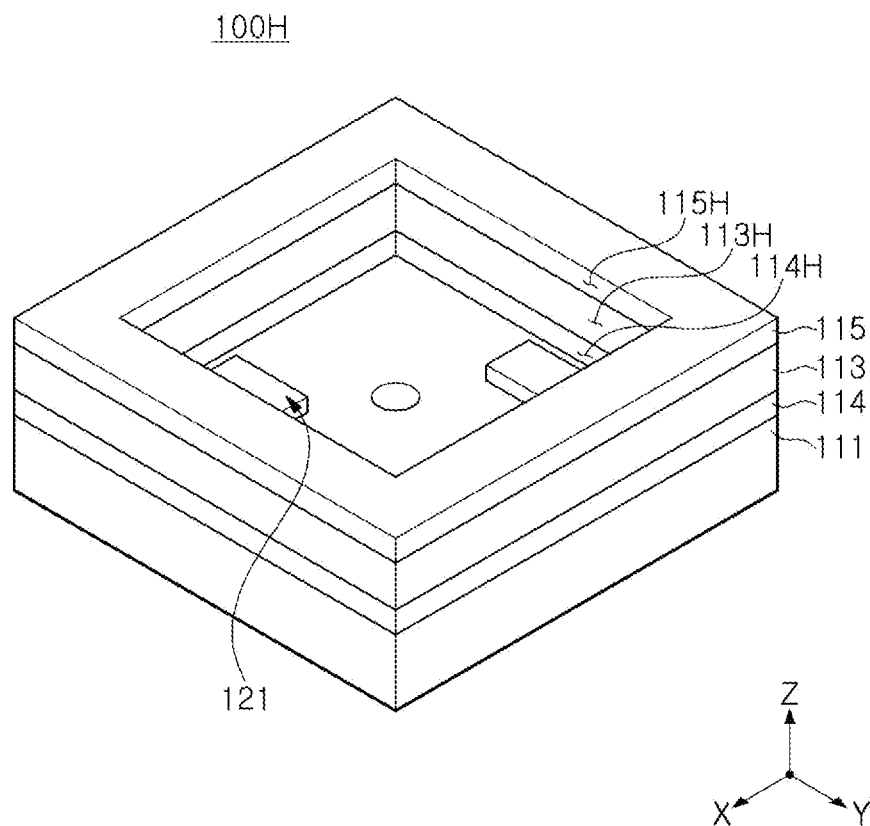
FIG. 28 is a perspective diagram illustrating an internal region of the antenna illustrated in FIG. 27.

FIG. 28 is a perspective diagram illustrating an internal region of the antenna illustrated in FIG. 27.

Figure 29:
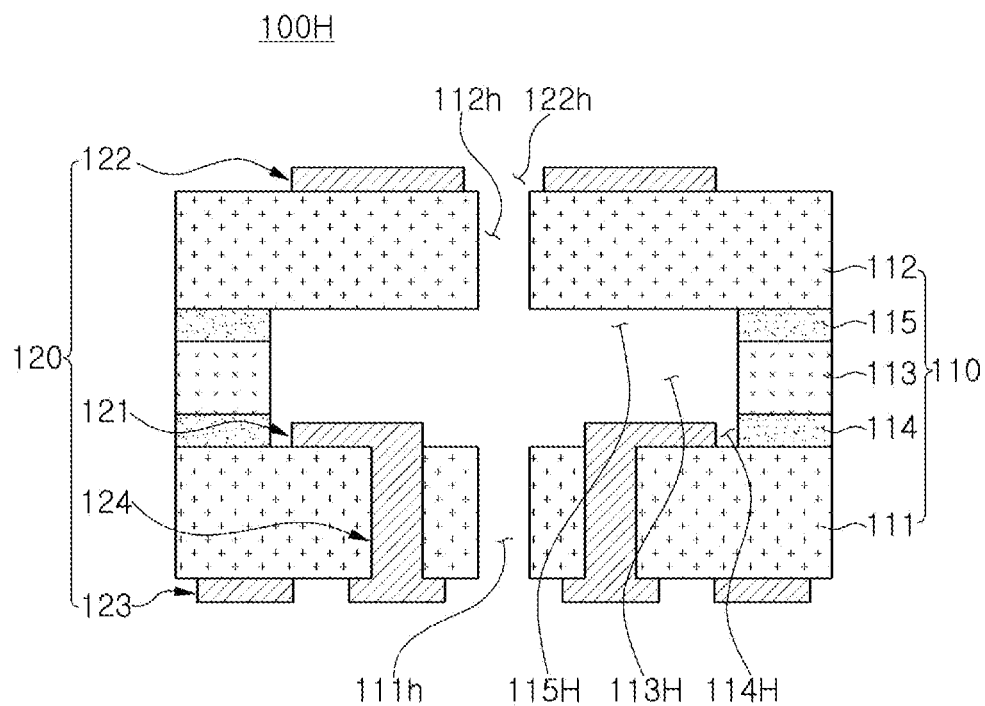
FIG. 29 is a cross-sectional diagram illustrating the antenna illustrated in FIG. 27 along line VIII-VIII'.

FIG. 29 is a cross-sectional diagram illustrating the antenna illustrated in FIG. 27 along line VIII-VIII'.

Referring to the diagrams, in an antenna 100A in another example embodiment, a first pattern layer 121 may include one or more feed patterns, a plurality of feed patterns, desirably, differently from the antenna 100G described in the aforementioned example embodiment. Also, a second pattern layer 122 may include a patch pattern. Also, a through-via layer 124 may include one or more feed vias, a plurality of feed vias, desirably, which connect one or more feed patterns, a plurality of feed patterns, desirably, to one or more pad patterns, a plurality of pad patterns, desirably, of the third pattern layer 123, respectively. Each of the one or more feed patterns, a plurality of feed patterns, desirably, of the first pattern layer 121 may have an planar area smaller than that of the patch pattern of the second pattern layer 122, and may partially overlap the patch pattern of the second pattern layer 122 on a plane.

The patch pattern of the second pattern layer 122 may be disposed such that sides of a quadrangular shape thereof are diagonally disposed with respect to sides of a cavity 113H. If desired, the patch pattern of the second pattern layer 122 may have a quadrangular shape with chamfered vertices, and sides of the quadrangle may be disposed diagonally with respect to sides of the cavity 113H. Also, the second pattern layer 122 may further include a plurality of coupling patterns arranged along sides of the quadrangular shape of the patch pattern of the second pattern layer 122 to surround the patch pattern.

The descriptions of the other elements are substantially the same as in the aforementioned example embodiment, and the detailed descriptions thereof will thus not be provided.

According to the aforementioned example embodiments, an antenna which may improve antenna performance and may stably obtain improved antenna performance, and may have improved reliability may be provided.

Also, an antenna which may increase efficiency and may have a reduced size may be provided.

In the example embodiments, the terms "side portion," "side surface," and the like, may be used to refer to a surface formed taken in right/left directions with reference to a cross-section in the diagrams for ease of description, the terms "upper side," "upper portion," "upper surfaces," and the like, may be used to refer to a surface formed in an upward direction with reference to a cross-section in the diagrams for ease of description, and the terms "lower side," "lower portion," "lower surface," and the like, may be used to refer to a surface formed in a downward direction. The notion that an element is disposed on a side region, an upper side, an upper region, or a lower resin may include the configuration in which the element is directly in contact with an element configured as a reference in respective directions, and the configuration in which the element is not directly in contact with the reference element. The terms, however, may be defined as above for ease of description, and the scope of right of the example embodiments is not particularly limited to the above terms.

In the example embodiments, the term "connected" may not only refer to "directly connected" but also include "indirectly connected" by means of an adhesive layer, or the like. Also, the term "electrically connected" may include both of the case in which elements are "physically connected" and the case in which elements are "not physically connected." Further, the terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the example embodiments.

In the example embodiments, the term "example embodiment" may not refer to one same example embodiment, but may be provided to describe and emphasize different unique features of each example embodiment. The above suggested example embodiments may be implemented do not exclude the possibilities of combination with features of other example embodiments. For example, even though the features described in one example embodiment are not described in the other example embodiment, the description may be understood as relevant to the other example embodiment unless otherwise indicated.

While the example embodiments have been shown and described above, it will be apparent to those skilled in the art that modifications and variations could be made without departing from the scope of the present invention as defined by the appended claims.

What is claimed is:
1. An antenna, comprising:
a first dielectric layer having a first surface, and a second surface opposing the first surface;
a second dielectric layer having a third surface, and a fourth surface opposing the third surface;
a reinforcing layer disposed between the first dielectric layer and the second dielectric layer, having a fifth surface, and a sixth surface opposing the fifth surface, and including an insulating material;

a first adhesive layer disposed between the second surface of the first dielectric layer and the fifth surface of the reinforcing layer;
a second adhesive layer disposed between the third surface of the second dielectric layer and the sixth surface of the reinforcing layer;
a first pattern layer disposed on the second surface of the first dielectric layer; and
a second pattern layer disposed on the fourth surface of the second dielectric layer,
wherein the reinforcing layer has a first cavity penetrating a region between the fifth surface and the sixth surface, and
wherein the first pattern layer is embedded in the first adhesive layer such that the first adhesive layer covers an upper surface of the first pattern layer.

2. The antenna of claim 1, wherein the reinforcing layer has an elastic modulus higher than an elastic modulus of each of the first and second adhesive layers.

3. The antenna of claim 1, wherein the reinforcing layer has one or more first venting holes, and
wherein each of the one or more first venting holes is exposed to the first cavity and an external side surface of the reinforcing layer.

4. The antenna of claim 1, wherein at least one of the first and second adhesive layers includes a second cavity penetrating the at least one of the first and second adhesive layers in a thickness direction and connected to the first cavity in the thickness direction.

5. The antenna of claim 4, wherein the at least one of the first and second adhesive layers has one or more second venting holes, and
each of the one or more second venting holes is exposed to the second cavity and at least one of external side surfaces of the at least one of the first and second adhesive layers.

6. The antenna of claim 1, wherein the first and second adhesive layers have second and third cavities penetrating the first and second adhesive layers, respectively, and connected to the first cavity in a thickness direction, and
wherein at least a portion of the first pattern layer is disposed in the second cavity.

7. The antenna of claim 6, wherein the reinforcing layer, the first adhesive layer, and the second adhesive layer have one or more first venting holes, one or more second venting holes, and one or more third venting holes, respectively, and
wherein the one or more first to third venting holes are connected to the first to third cavities on a plane, respectively, are exposed to an external side surface of the reinforcing layer, an external side surface of the first adhesive layer, and an external side surface of the second adhesive layer, respectively, and are connected to one another in a thickness direction.

8. The antenna of claim 6, wherein the first dielectric layer has a first through-hole penetrating through the first surface and the second surface,
wherein the second dielectric layer has a second through-hole penetrating through the third surface and the fourth surface, and
wherein the first and second through-holes are connected to the second and third cavities, respectively, in a thickness direction.

9. The antenna of claim 1, wherein each of the first and second dielectric layers has a dielectric constant, Dk, greater than dielectric constants of each of the reinforcing layer and the first adhesive layer, and
wherein the second adhesive layer has a dielectric constant, Dk, greater than the dielectric constant of the first adhesive layer.

10. The antenna of claim 1, wherein the first and second dielectric layers and the reinforcing layer include polytetrafluoroethylene (PTFE), ceramic filler, and woven glass fiber.

11. The antenna of claim 1, wherein each of the first and second dielectric layers has a thickness greater than a thickness of the reinforcing layer, and
wherein the reinforcing layer has a thickness greater than a thickness of each of the first and second adhesive layers.

12. The antenna of claim 1, further comprising:
a third pattern layer disposed on the first surface of the first dielectric layer; and
a through-via layer penetrating the first dielectric layer.

13. The antenna of claim 12, wherein the first to third pattern layers include a patch pattern, a coupling pattern, and a plurality of pad patterns, respectively,
wherein the patch pattern and the coupling pattern overlap each other in a thickness direction, and
wherein the through-via layer connects the patch pattern to at least one of the plurality of pad patterns.

14. The antenna of claim 12, wherein the first to third pattern layers include one or more feed patterns, a patch pattern, and a plurality of pad patterns, respectively,
wherein each of the one or more feed patterns has a planar area smaller than an area of the patch pattern, and
wherein the through-via layer connects the one or more feed patterns to one or more of the plurality of pad patterns.

15. An antenna, comprising:
a body portion including a plurality of dielectric layers, and a plurality of adhesive layers disposed between the plurality of dielectric layers; and
a pattern portion including a first pattern layer disposed in the body portion and a second pattern layer disposed on the body portion,
wherein a dielectric layer, among the plurality of dielectric layers, disposed between the plurality of adhesive layers has a cavity partially overlapping each of the first and second pattern layers in a stacking direction of the dielectric and adhesive layers, and
wherein an adhesive layer, among the plurality of adhesive layers, covers an upper surface of the first pattern layer.

16. The antenna of claim 15, wherein at least one through-hole extends from the cavity to an external surface of the antenna.

17. The antenna of claim 16, wherein the at least one through-hole extends through at least one of the plurality of dielectric layers.

18. The antenna of claim 15, wherein the dielectric layer disposed between the plurality of adhesive layers has a composition different from the dielectric layers disposed above the uppermost adhesive layer and below the lowermost adhesive layer.

19. An antenna, comprising:
first and second stacked dielectric layers having a third dielectric layer disposed therebetween;
first and second adhesive layers respectively disposed between the first and third dielectric layers and between the second and third dielectric layers; and
first and second conductive patterns disposed on different ones of the first, second, and third dielectric layers, wherein the third dielectric layer has a composition different from the first and second dielectric layers, and provides a cavity extending between the first and second dielectric layers, and wherein the first adhesive layer covers an upper surface of the first conductive pattern.

20. The antenna of claim 19, wherein at least one through-hole extends from the cavity to an external surface of the antenna.

21. The antenna of claim 20, wherein the at least one through-hole extends through the first or second dielectric layer.

22. The antenna of claim 20, wherein the at least one through-hole extends through the third dielectric layer from the cavity to an external surface of the third dielectric layer.

23. The antenna of claim 19, wherein the first and second conductive patterns overlap with the cavity in a stacking direction of the dielectric layers.

24. The antenna of claim 19, wherein the first conductive pattern is disposed between the first and second dielectric layers, and the second conductive pattern is disposed on an outer surface of the second dielectric layer.

25. The antenna of claim 24, further comprising at least one via extending through the first dielectric layer and connected to the first conductive pattern.

26. The antenna of claim 24, wherein the second conductive pattern is disposed on an upper surface of the second dielectric layer, and sides of the second conductive pattern are non-parallel to sides of the second dielectric layer.

27. The antenna of claim 19, wherein the first conductive pattern is disposed between the first and second dielectric layers and is embedded in the first adhesive layer.

28. The antenna of claim 19, at least one of the first and second adhesive layers has a gap formed therein which provides a through-hole extending from the cavity to an external surface of the antenna.

29. An antenna, comprising:
a first dielectric layer having a first surface, and a second surface opposing the first surface;
a second dielectric layer having a third surface, and a fourth surface opposing the third surface;
a reinforcing layer disposed between the first dielectric layer and the second dielectric layer, having a fifth surface, and a sixth surface opposing the fifth surface, and including an insulating material;
a first adhesive layer disposed between the second surface of the first dielectric layer and the fifth surface of the reinforcing layer;
a second adhesive layer disposed between the third surface of the second dielectric layer and the sixth surface of the reinforcing layer;
a first pattern layer disposed on the second surface of the first dielectric layer; and
a second pattern layer disposed on the fourth surface of the second dielectric layer,
wherein the reinforcing layer has a first cavity penetrating a region between the fifth surface and the sixth surface,
wherein the first and second adhesive layers have second and third cavities penetrating the first and second adhesive layers, respectively, and connected to the first cavity in a thickness direction, and
wherein at least a portion of the first pattern layer is disposed in the second cavity.

30. An antenna, comprising:
a first dielectric layer having a first surface, and a second surface opposing the first surface;
a second dielectric layer having a third surface, and a fourth surface opposing the third surface;
a reinforcing layer disposed between the first dielectric layer and the second dielectric layer, having a fifth surface, and a sixth surface opposing the fifth surface, and including an insulating material;
a first adhesive layer disposed between the second surface of the first dielectric layer and the fifth surface of the reinforcing layer;
a second adhesive layer disposed between the third surface of the second dielectric layer and the sixth surface of the reinforcing layer;
a first pattern layer disposed on the second surface of the first dielectric layer; and
a second pattern layer disposed on the fourth surface of the second dielectric layer,
wherein the reinforcing layer has a first cavity penetrating a region between the fifth surface and the sixth surface,
wherein each of the first and second dielectric layers has a dielectric constant, Dk, greater than dielectric constants of each of the reinforcing layer and the first adhesive layer, and
wherein the second adhesive layer has a dielectric constant, Dk, greater than the dielectric constant of the first adhesive layer.

* * * * *